US012595772B2

(12) United States Patent
Huang et al.

(10) Patent No.: US 12,595,772 B2
(45) Date of Patent: Apr. 7, 2026

(54) APPARATUS AND METHOD FOR REGULATING GASEOUS FUEL PRESSURE AND MITIGATING EMISSIONS IN AN INTERNAL COMBUSTION ENGINE SYSTEM

(71) Applicant: CESPIRA CANADA LIMITED PARTNERSHIP, Vancouver (CA)

(72) Inventors: Jian Huang, Surrey (CA); Sandeep Munshi, Delta (CA)

(73) Assignee: Cespira Canada LP, Vancouver (CA)

( * ) Notice: Subject to any disclaimer, the term of this patent is extended or adjusted under 35 U.S.C. 154(b) by 0 days.

(21) Appl. No.: 18/834,887

(22) PCT Filed: Jan. 30, 2023

(86) PCT No.: PCT/CA2023/050123
§ 371 (c)(1),
(2) Date: Jul. 31, 2024

(87) PCT Pub. No.: WO2023/147652
PCT Pub. Date: Aug. 10, 2023

(65) Prior Publication Data

US 2025/0129752 A1 Apr. 24, 2025

Related U.S. Application Data

(60) Provisional application No. 63/305,669, filed on Feb. 1, 2022.

(51) Int. Cl.
*F02D 41/00* (2006.01)
*F02D 41/14* (2006.01)

(52) U.S. Cl.
CPC ..... *F02D 41/0027* (2013.01); *F02D 41/1406* (2013.01); *F02D 2200/0602* (2013.01);
(Continued)

(58) Field of Classification Search
CPC ............ F02D 41/0027; F02D 41/1406; F02D 2200/0602; F02D 2200/1002
See application file for complete search history.

(56) References Cited

U.S. PATENT DOCUMENTS 7,140,354 B1 11/2006 Hashemi
8,958,972 B1 * 2/2015 Fisher .................... B61C 17/02
701/22
(Continued)

FOREIGN PATENT DOCUMENTS

DE 102008029493 A1 12/2009
DE 102009012250 A1 9/2010
EP 3510271 B1 7/2019

OTHER PUBLICATIONS

ISR and Written Opinion, mailed Apr. 5, 2023 for international application PCT/CA2023/050123 filed Jan. 30, 2023; 14 pages.
(Continued)

*Primary Examiner* — Kevin A Lathers
(74) *Attorney, Agent, or Firm* — Carie C. Mager

(57) ABSTRACT

An engine fueled with a gaseous fuel includes a storage vessel storing the gaseous fuel in the gas state. For an engine speed and engine load, a storage-pressure brake thermal efficiency (where an injection pressure equals the storage pressure) is compared to a second-pressure brake thermal efficiency (where the injection pressure is equal to the second pressure and based on a parasitic energy cost of pressurizing the gaseous fuel from the storage pressure to the second pressure). The gaseous fuel is pressurized from the storage pressure to the second pressure when the second-pressure brake thermal efficiency is greater than the storage-pressure brake thermal efficiency.

25 Claims, 17 Drawing Sheets

(52) U.S. Cl.
CPC ................ *F02D 2200/1002* (2013.01); *F02D 2200/101* (2013.01); *F02D 2250/31* (2013.01)

(56) References Cited

U.S. PATENT DOCUMENTS

| | | | | |
|---|---|---|---|---|
| 10,100,773 | B2 * | 10/2018 | Surnilla | F02D 41/0025 |
| 2014/0309909 | A1 * | 10/2014 | McMahon | F02D 19/0647 701/103 |
| 2015/0101566 | A1 | 4/2015 | Leone et al. | |
| 2017/0130657 | A1 | 5/2017 | Mctaggart-Cowan et al. | |
| 2021/0088003 | A1 | 3/2021 | Dobrogowski et al. | |
| 2021/0301775 | A1 | 9/2021 | Puran et al. | |

OTHER PUBLICATIONS

Extended European Search Report, mail date Dec. 23, 2025, 9 pages, for European application No. 23749306.9.
Deb Madhujit et al: “an experimental investigation of performance-emission trade off characteristics of a CI engine using hydrogen as dual fuel”, Energy, Elsevier, Amsterdam, NL, vo. 85, Apr. 30, 2015 (Apr. 30, 2015), pp. 569-585, XP029171787, ISSN: 0360-5442, DOI: 10.1016.J.ENERGY.2015.03.108.

* cited by examiner

103

300

1000 RPM

1200 RPM

1600 RPM

400

500

APPARATUS AND METHOD FOR REGULATING GASEOUS FUEL PRESSURE AND MITIGATING EMISSIONS IN AN INTERNAL COMBUSTION ENGINE SYSTEM

TECHNICAL FIELD

The present application relates to an apparatus and method for regulating gaseous fuel pressure in an internal combustion engine, and more particularly for regulating gaseous fuel pressure while considering the mitigation of emissions in an internal combustion engine.

BACKGROUND

The following discussion of the background is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Gaseous fuel direct injection (GFDI) is a technique of introducing a high pressure gaseous fuel into a combustion chamber of an internal combustion engine where gaseous fuel is injected directly into the combustion chamber near the latter part of a compression stroke. Accordingly, the injection pressure of the gaseous fuel needs to be greater than the pressure in the combustion chamber (also known as in-cylinder pressure) at the time of injection. GFDI engines are typically fueled with natural gas that is stored in a liquefied form at cryogenic temperatures of around 112 Kelvin (K). A cryogenic pump pressurizes the liquefied natural gas that is fluidly communicated through a heat exchanger to vaporize and change the state of the natural gas to either a gas state or a supercritical state (determined by the pressure and the temperature of the vaporized natural gas). The gaseous fuel injection pressure employed in GFDI engines is around 300 bar. In exemplary embodiments, the cryogenic pump pressurizes the liquefied and vaporized gaseous fuel to a value between a range of 320 to 340 bar, for example, such that the vaporized natural gas can be down regulated to the final injection pressure of 300 bar. It is more efficient to pressurize the natural gas in the liquefied form than in the vaporized form since in the liquefied form the natural gas behaves like an incompressible fluid whereas in the vaporized form the natural gas a compressible fluid. There is a significant energy penalty associated with pressurizing compressible fluids compared to incompressible fluids, which decreases the fuel economy of a GFDI internal combustion engine.

There is renewed interest in employing hydrogen as a fuel for internal combustion engines. Hydrogen is a carbonless fuel and accordingly does not produce carbon-based green house gases (GHG) such as carbon dioxide. Hydrogen is currently employed as a fuel in fuel cell applications where the hydrogen is stored as a compressed gas at typical maximum storage pressures of 700 bar. Hydrogen fuel cells typically operate with a hydrogen pressure of between 3 and 4 bar such that the storage pressure of hydrogen is down regulated to this operating pressure value. The high value of the maximum storage pressure of 700 bar is selected to increase the storage density of hydrogen to extend the range of the fuel cell vehicle, since the hydrogen is stored as a compressed gas and not in its liquefied form. Currently, it is significantly more expensive to liquefy hydrogen compared to natural gas since the boiling point of hydrogen at atmospheric pressure is around 20.27 K (compared to the boiling point of natural gas of around 112 K) and its density at standard temperature and pressure (STP) (0.0899 $kg/m^3$) is low compared to the density of natural gas at STP (between 0.7 to 0.9 $kg/m^3$); that is approximately an order of magnitude denser than hydrogen. In the context of this application, standard temperature is 273.15 K (0 degrees Celsius), and standard pressure is 1 atmosphere (atm). Moreover, a gaseous fuel is any fuel that is in the gas state at standard temperature and pressure. Hydrogen and natural gas are exemplary gaseous fuels, in addition to ammonia, biogas, ethane, methane, methane rich gases from fossils or renewable resources, propane, butane or mixtures of these fuels.

Conventional techniques for pressurizing gaseous fuels in internal combustion engines do not consider the costs associated with mitigating emissions. Both gaseous fuels and liquid fuels combusted in internal combustion engines produce emissions that require mitigation to control the quantity of these emissions let into the environment. Mitigation techniques can include modification of engine operating parameters that affect the production of emissions during combustion and processing an exhaust stream resulting from combustion by an aftertreatment system. Current techniques involve measuring emissions, for example generated NOx emissions and then reacting to decrease NOx emissions when the level released into the environment is above an acceptable level.

The state of the art is lacking in techniques for regulating gaseous fuel pressure in internal combustion engines. The present apparatus and method provide a technique for regulating gaseous fuel pressure in internal combustion engines.

SUMMARY

An improved apparatus for an internal combustion engine fueled with a gaseous fuel includes a storage vessel storing the gaseous fuel in the gas state as a compressed gas at a storage pressure, where the storage pressure decreases as the internal combustion engine consumes the gaseous fuel. A pressurizer is in fluid communication with the storage vessel for pressurizing the gaseous fuel above the storage pressure. There is a bypass valve in fluid communication with the storage vessel and operable between an open position allowing the flow of gaseous fuel therethrough bypassing the pressurizer and a closed position blocking the flow of the gaseous fuel therethrough. A gaseous-fuel rail is in fluid communication with the pressurizer and the bypass valve to receive the gaseous fuel. There is a first pressure sensor that generates signals representative of a storage pressure of the gaseous fuel in the storage vessel, and a second pressure sensor that generates signals representative of an injection pressure of the gaseous fuel in the gaseous-fuel rail. A controller is operatively connected with the pressurizer, the bypass valve, and the first and second pressure sensors. The controller is programmed to receive the signals from the first and second pressure sensors and determine the storage pressure and the injection pressure respectively; selectively command the pressurizer to pressurize the gaseous fuel from the storage pressure to a second pressure in the fuel rail; and selectively command the bypass valve between the closed position and the open position. For an engine speed and an engine load condition the controller is further programmed to determine a storage-pressure brake thermal efficiency based on the injection pressure where the gaseous fuel is delivered to the fuel rail without increasing the storage pressure of the gaseous fuel whereby the injection pressure of the gaseous fuel is equal to the storage pressure of the gaseous fuel within a first margin; determine a second-pressure brake thermal efficiency based on the injection pressure and an energy cost of pressurizing the gaseous fuel from the storage pressure to the second pressure whereby the injection pressure is equal to the second pressure within a second margin; command the pressurizer to pressurize the gaseous fuel from the storage pressure to the second pressure in the fuel rail when the second-pressure brake thermal efficiency is greater than the storage-pressure brake thermal efficiency; and command the bypass valve to the open position when the second-pressure brake thermal efficiency is less or equal to the storage-pressure brake thermal efficiency. The internal combustion engine further includes an in-cylinder injector operatively connected with the controller and in fluid communication with the gaseous-fuel rail to receive the gaseous fuel and to directly inject the gaseous fuel into a combustion chamber of the internal combustion engine. The controller can be programmed to selectively actuate the in-cylinder injector to introduce the gaseous fuel into the combustion chamber. The determination of the second-pressure brake thermal efficiency can include the energetic cost of pressurizing the gaseous fuel from the storage pressure to the second pressure.

The second pressure can be one of a plurality of pressures above the storage pressure. The controller can be further programmed to determine respective brake thermal efficiencies for each pressure in the plurality of pressures, where each brake thermal efficiency is based on the respective one of the plurality of pressures and a respective energetic cost of pressurizing the gaseous fuel from the storage pressure to the respective one of the plurality of pressures, wherein the second-pressure brake thermal efficiency is the largest of the respective brake thermal efficiencies.

The storage pressure can be less than a peak brake-thermal-efficiency pressure for the engine speed and the engine load condition, where the peak brake-thermal-efficiency pressure is an injection pressure that results in a peak BTE for the engine speed and the engine load condition.

The storage-pressure brake thermal efficiency and the second-pressure brake thermal efficiency can be effective brake thermal efficiencies that are further based on a reductant employed to mitigate emissions in an aftertreatment system, where the reductant contributes to an equivalent fuel consumption of the internal combustion engine but not to heat generated by combusting the gaseous fuel within the combustion chamber. The reductant can be selected from at least one of ammonia, hydrogen, and urea. The emissions can include at least one of nitrogen oxides (NOx) and carbon dioxide ($CO_2$). When both the gaseous fuel and the reductant are hydrogen there can be a fueling portion of hydrogen that is combusted in the combustion chamber to generate heat and a reductant portion of hydrogen that is employed in the aftertreatment system to mitigate emissions. There can be an unburned portion of hydrogen of the fueling portion of hydrogen that is not combusted in the combustion chamber, and the controller can be further programmed to determine the reductant portion of hydrogen based on the unburned portion of hydrogen, where the unburned portion of hydrogen and the reductant portion of hydrogen cooperate to mitigate emissions. The controller can be further programmed to convert a quantity of the reductant consumed in the aftertreatment system to a quantity of gaseous fuel equivalent, and the controller can be further programmed to determine the equivalent fuel consumption as a sum of a quantity of gaseous fuel consumed by the internal combustion engine and the quantity of gaseous fuel equivalent of the reductant consumed by the aftertreatment system. The controller can be programmed with a conversion factor to convert the quantity of the reductant consumed in the aftertreatment system to the quantity of gaseous fuel equivalent of the reductant consumed by the aftertreatment system. The controller can be programmed to determine the quantity of gaseous fuel equivalent of the reductant consumed by the aftertreatment system as a product of the quantity of the reductant consumed in the aftertreatment system and the conversion factor. The controller can be programmed to determine the conversion factor as a ratio between a price of reductant preferably per unit quantity over a price of the gaseous fuel preferably per unit quantity. The controller can be programmed to determine the conversion factor as a ratio between a quantity of $CO_2$ produced per unit quantity of reductant consumed in the aftertreatment system over a quantity of $CO_2$ produced per unit quantity of gaseous fuel consumed in the internal combustion engine. The controller can be programmed to determine the conversion factor as a ratio between a lower heating value of the reductant over a lower heating value of the gaseous fuel.

An improved method of operating an internal combustion engine fueled with a gaseous fuel includes storing the gaseous fuel in the gas state as a compressed gas at a storage pressure, the storage pressure decreasing as the internal combustion engine consumes the gaseous fuel; delivering the gaseous fuel from the storage vessel to a fuel rail, where the gaseous fuel is selectively introduced from the fuel rail into a combustion chamber of the internal combustion engine at an injection pressure; selectively pressurizing the gaseous fuel from the storage pressure to a second pressure in the fuel rail; for an engine speed and an engine load condition: determining a storage-pressure brake thermal efficiency based on the injection pressure where the gaseous fuel is delivered to the fuel rail without increasing the storage pressure of the gaseous fuel whereby the injection pressure of the gaseous fuel is equal to the storage pressure of the gaseous fuel within a first margin; determining a second-pressure brake thermal efficiency based on the injection pressure and an energy cost of pressurizing the gaseous fuel from the storage pressure to the second pressure whereby the injection pressure is equal to the second pressure within a second margin; and pressurizing the gaseous fuel from the storage pressure to the second pressure in the fuel rail when the second-pressure brake thermal efficiency is greater than the storage-pressure brake thermal efficiency. The determination of the second-pressure brake thermal efficiency can include the energetic cost of pressurizing the gaseous fuel from the storage pressure to the second pressure.

BRIEF DESCRIPTION OF THE DRAWINGS

The accompanying drawings, which are incorporated into and constitute a part of the specification, illustrate specific embodiments of the apparatus, systems, and methods and, together with the general description above, and the detailed description of the specific embodiments, serve to explain the principles of the apparatus, systems, and methods.

DETAILED DESCRIPTION

Figure 1:
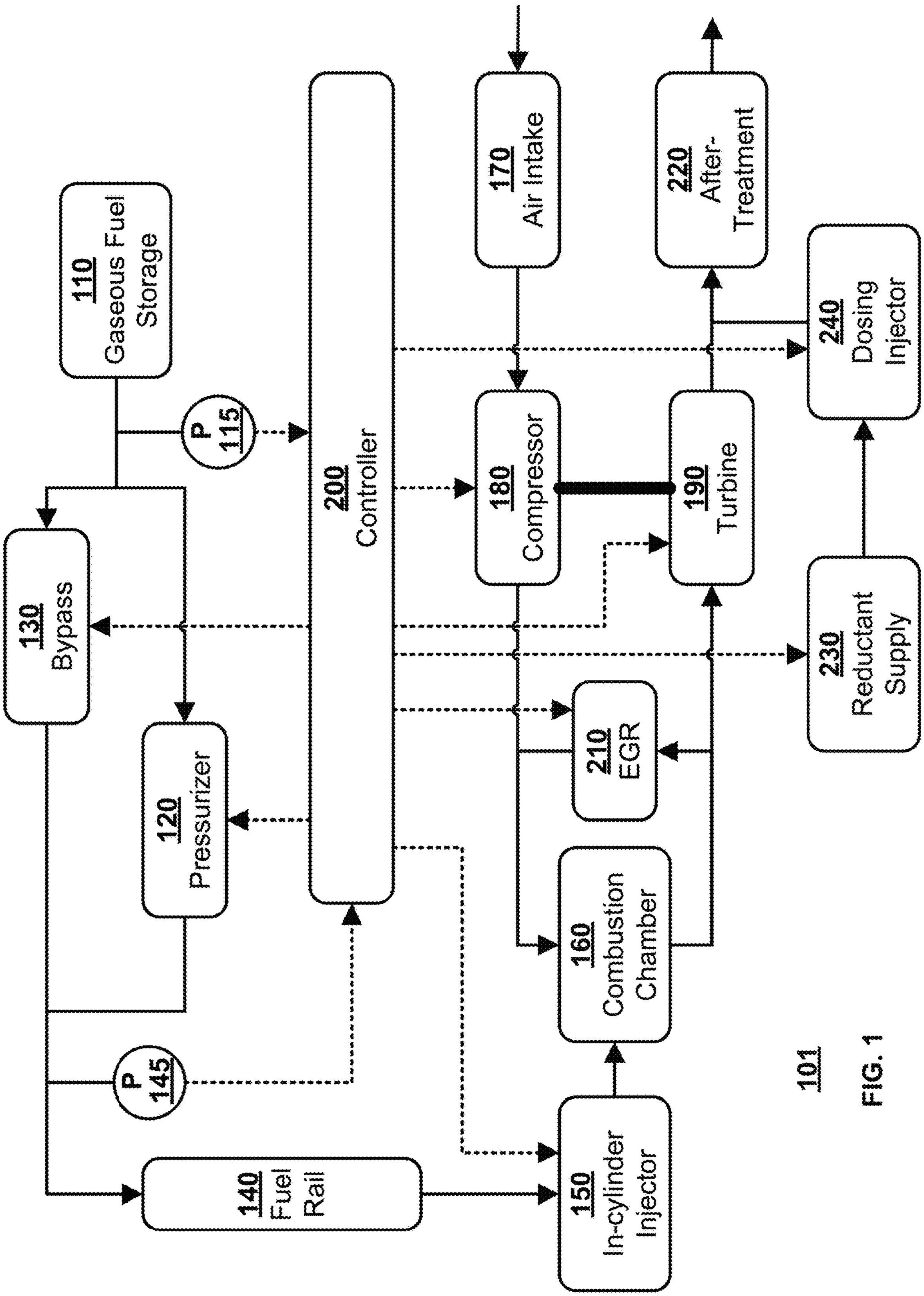
FIG. 1 is a schematic view of an internal combustion engine system according to an embodiment.

Throughout the specification and claims, the following terms take the meanings explicitly associated herein, unless the context clearly dictates otherwise. The phrases "in one embodiment," "in some embodiments", "in an exemplary embodiment," and "in some exemplary embodiments" as used herein do not necessarily refer to the same embodiment(s), though it may. Furthermore, the phrases "in other embodiments," "another embodiment," and "in some embodiments" as used herein do not necessarily refer to a different embodiment, although it may. Thus, as described below, various embodiments of the invention may be readily combined, without departing from the scope of the invention.

The term "and/or" is used herein to mean "one or the other or both". In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references unless the context clearly dictates otherwise. The term "substantially," as modifying a parameter having a stated limit, is to be construed as meaning something that effectively possesses the same property or achieves the same function as that of the stated limit, and includes exactly the stated limit as well as insignificant deviations therefrom.

Although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described herein. In cases where examples are listed, it is to be understood that combinations of any of the alternative examples are also envisioned. The scope of the invention is not to be limited to the particular embodiments disclosed herein, which serve merely as examples representative of the limitations recited in the issued claims resulting from this application, and the equivalents of those limitations.

Various features may be grouped together in example embodiments for the purpose of streamlining the disclosure, but this method of disclosure should not be interpreted as reflecting an intention that any claimed embodiment requires more features than are expressly recited in a corresponding claim. Rather, inventive subject matter may lie in less than all features of a single disclosed example embodiment or may combine features from different figures or different embodiments. Thus, the appended claims are hereby incorporated into the detailed description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein or disclosed in a single figure or embodiment. Conversely, the scope of the appended claims does not necessarily encompass the whole of the subject matter disclosed herein.

Referring to FIG. 1, internal combustion engine system 101 is illustrated according to an embodiment that regulates an injection pressure of gaseous fuel for direct injection into a combustion chamber, which can take the mitigation of emissions generated by the internal combustion engine into consideration in the pressure regulation strategy. Storage vessel 110 is preferably a pressure cylinder that stores the gaseous fuel as a compressed gas. Typical storage pressures at which refueling stations can pressurize storage vessel 110 are 300 bar and 700 bar; however, other refueling storage pressures, both higher and lower and in between, are contemplated. Exemplary gaseous fuels that can be stored in storage vessel 110 include ammonia, biogas, ethane, hydrogen, methane, natural gas, propane, butane, renewable gaseous fuels, or mixtures of these fuels. Pressurizer 120 and bypass valve 130 are each fluidly connected with storage vessel 110 to receive gaseous fuel therefrom on a respective input side and are each fluidly connected with gaseous-fuel rail 140 to supply gaseous fuel thereto on a respective output side. Pressurizer 120 receives gaseous fuel at storage pressure from storage vessel 110 and pressurizes the gaseous fuel to a second pressure. In exemplary embodiments, pressurizer 120 is a compressor or a pump. Electronic controller 200 can be operatively connected with pressurizer 120 to command its operation, particularly when pressurizer 120 is electrically driven or hydraulically driven, in which circumstance electrical switches (not shown) and mechanical valves (not shown), respectively can be commanded by controller 200 to selectively apply electrical energy and hydraulic energy, respectively, to pressurizer 120. In other embodiments, pressurizer 120 can be driven by a camshaft or an engine power take-off from the internal combustion engine, in which case a clutch (not shown) controlled by controller 200 can be employed to turn the pressurizer on and off. Electronic controller 200 commands bypass valve 130 to open, in which case the gaseous fuel is diverted around pressurizer 120, or commands bypass valve 130 to close, in which case the gaseous fuel is blocked through bypass valve 130. Injection pressure in gaseous-fuel rail 140 (also referred to as gaseous-fuel rail pressure herein) is substantially equal to storage pressure in storage vessel 110 when bypass valve 130 is open, where those skilled in the technology understand there may be minor pressure drops through bypass valve 130 as gaseous fuel flows therethrough. In this circumstance, when bypass valve 130 is open, the storage pressure in storage vessel 110 is preferably greater than a minimum desired injection pressure such that pressurizer 120 does not need to pressurize the gaseous fuel from storage vessel 110. Injection pressure in gaseous-fuel rail 140 is controlled by pressurizer 120 when bypass valve 130 is closed and pressurizer 120 is pressurizing the gaseous fuel received from storage vessel 110 into gaseous-fuel rail 140. In this circumstance, when bypass valve 130 is closed, controller 200 can command pressurizer 120 to pressurize the gaseous fuel received from storage vessel 110 to the second pressure, where the second pressure is the injection pressure in gaseous-fuel rail 140. Gaseous-fuel rail 140 can store a desired volume of pressurized gaseous fuel at injection pressure as a buffer against fuel demand from the internal combustion engine, which may be a vessel or appropriately sized piping supplying fuel from pressurizer 120 and bypass valve 130 to in-cylinder injector 150. In other embodiments, internal combustion engine system 101 can include an accumulator upstream of gaseous-fuel rail 140. As would be understood by those familiar with the technology, internal combustion engine system 101 can include various other valves not illustrated in FIG. 1, such as shut-off valves, pressure relief valves, and check valves. Particularly, a shut-off can be employed to isolate pressurized fluid from downstream components that may leak gaseous fuel when the engine is shut-off. There may be small pressure drops across these valves when there is a mass flow of gaseous fuel through the valves; however, this pressure drop is negligible compared to the value of typical injection pressures.

Pressure sensor 115 generates signals representative of the storage pressure of the gaseous fuel in storage vessel 110. Pressure sensor 145 generates signals representative of the injection pressure of gaseous fuel in gaseous-fuel rail 140. Electronic controller 200 is operatively connected with pressure sensors 115 and 145 to receive the signals representative of storage pressure and injection pressure, respectively, and programmed to determine the storage pressure and the injection pressure accordingly.

In-cylinder injector 150 can be fluidly connected with gaseous-fuel rail 140 and commanded by controller 200 to inject gaseous fuel directly into combustion chamber 160. In an exemplary embodiment, in-cylinder injector 150 is hydraulically actuated to inject gaseous fuel into combustion chamber 160 later during a compression stroke of the internal combustion engine, for example later than 90 crank angle degrees (CA°) before top dead center (TDC). In other embodiments, in-cylinder injector 150 can be directly actuated, such as by a solenoid actuator, a piezoelectric actuator, or a magnetostrictive actuator, where in direct actuation, the actuator acts directly on an injection needle (not shown) of the injector controlling the flow of the gaseous fuel, instead of acting on a needle controlling the flow of hydraulic fluid that in turn acts on the injection needle. Although only one such in-cylinder injector 150 and combustion chamber 160 is illustrated, there can be a plurality of fuel injectors in other embodiments each associated with a respective combustion chamber.

The gaseous fuel injected into combustion chamber 160 can be ignited using conventional ignition techniques. For example, the gaseous fuel in combustion chamber 160 can be ignited with a positive ignition source (not shown) commanded by controller 200 to create an ignition event within the combustion chamber. The positive ignition source can be a spark igniter, a heated surface such as a glow plug, a corona-discharge igniter, an induction-heating igniter, pilot fuel or other types of conventional positive ignition sources.

Air intake 170 includes conventional components in an air intake system including an air filter and air ducts. The intake air can be pressurized through compressor apparatus 180 driven by exhaust turbine apparatus 190 that together form a turbocharger apparatus. Compressor apparatus 180 can include a compressor-bypass valve whereby intake air can be fluidly communicated through the compressor apparatus without pressurization. Compressor apparatus 180 is commanded by controller 200 to either pressurize the intake air or to let intake air pass through without pressurization. Intake air is fluidly communicated to combustion chamber 160 where it is delivered therein through a respective intake valve. The intake air can be mixed with exhaust gas from exhaust gas recirculation (EGR) apparatus 210 that can selectively fluidly communicate at least a portion of the exhaust gas from combustion chamber 160 back to the upstream side of the combustion chamber, such as into an intake pipe, an intake manifold, or an intake runner. EGR apparatus 210 can include an EGR valve and an EGR cooler to manage the temperature of the hot exhaust gas. Although the EGR apparatus 210 is illustrated as delivering exhaust gas downstream from the compressor apparatus 180, in other embodiments the exhaust gas can be delivered upstream of compressor apparatus 180, and preferably the exhaust gas is filtered within EGR apparatus 210. EGR apparatus 210 is commanded by controller 200 to recirculate at least a portion of exhaust gas. Turbine apparatus 190 receives exhaust gas from combustion chamber 160 where that exhaust gas drives a turbine therein, which in turn drives a compressor in compressor apparatus 180. Turbine apparatus 190 can include a turbo-bypass valve whereby at least a portion of the exhaust gas can be fluidly communicated through turbine apparatus 190 without driving the turbine therein. Turbine apparatus 190 is commanded by controller 200 to bypass at least a portion of the exhaust gas around the turbine or not, and in either event the exhaust gas exits the turbine apparatus into an exhaust conduit fluidly communicating the exhaust gas to aftertreatment 220. The exhaust gas can include emissions such as carbon monoxide, carbon dioxide, nitrogen oxides (NOx), sulfur dioxide and unburned fuel. The carbon-containing emissions are ideally zero when the fuel does not contain any carbon, such as hydrogen. However, even when the fuel is hydrogen, there can be carbon containing emissions when a carbon-containing pilot fuel is employed to ignite the hydrogen, and/or when the internal combustion engine is lubricated with carbon-based lubricants. Aftertreatment 220 can include at least one of a NOx reduction catalyst, a NOx trap, a selective catalytic reduction (SCR) catalyst, and a particulate filter, arranged in a variety of configurations, either as separate components or as an integrated component or brick. NOx emissions occur for a variety of gaseous fuels, and when the gaseous fuel is hydrogen the NOx emissions can have an increased magnitude since hydrogen can burn with higher peak combustion chamber temperatures compared to other gaseous fuels. To mitigate NOx emissions a reductant is mixed with exhaust gas in the exhaust conduit downstream from turbine apparatus 190 such that the exhaust-gas/reductant mixture is delivered to the NOx reduction catalyst in aftertreatment 220. Reductant supply 230 stores a reductant, such as a diesel emission fluid that contains urea and can include a pump to pressurize the reductant to a suitable pressure for injection to the exhaust conduit. The pressurized reductant is fluidly communicated to dosing injector 240 that selectively injects the reductant into the exhaust conduit to mix with the exhaust gas forming the exhaust-gas/reductant mixture. In other embodiments, dosing injector 240 can be supplied with the gaseous fuel from storage vessel 110 as the reductant, for example when the gaseous fuel is hydrogen, in which circumstance a reductant-pressure regulator (not shown) can deliver the gaseous fuel to dosing injector 240 at a suitable pressure for injection into the exhaust conduit. Alternatively, in-cylinder injector 150 can inject an emission mitigation quantity of hydrogen into combustion chamber 160 during an exhaust stroke where the emission mitigation quantity is intended to mitigate emissions in combustion chamber 160 and/or aftertreatment 220.

Figure 2:
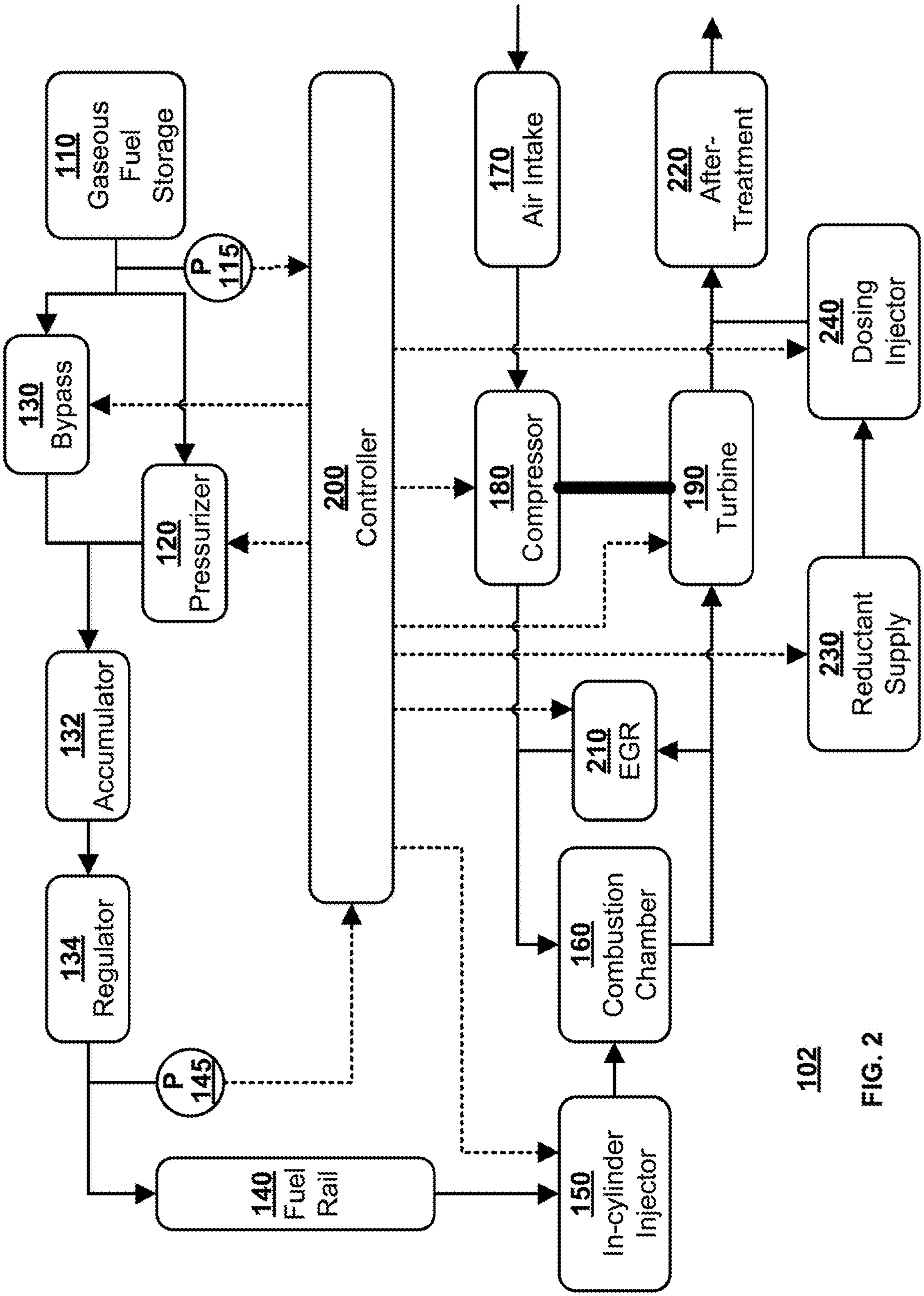
FIG. 2 is a schematic view of an internal combustion engine system according to another embodiment.

Referring now to FIG. 2, there is shown internal combustion engine system 102 according to another embodiment that regulates an injection pressure of gaseous fuel in gaseous-fuel rail 140 for injection into combustion chamber 160, which can take the mitigation of emissions generated by the internal combustion engine into consideration in the pressure regulation strategy. Internal combustion engine system 102 is similar to internal combustion engine system 101 where like parts in this and all other embodiments have like reference numerals and at least differences are discussed. This embodiment includes accumulator 132 that on an accumulator input side is in fluid communication with pressurizer 120 and bypass valve 130 to receive the gaseous fuel and on an accumulator output side is in fluid communication with pressure regulator 134. Accumulator 132 allows a desired volume of gaseous fuel to be stored at an accumulator pressure that can be at a higher pressure than storage pressure in gaseous-fuel storage 110. Pressure regulator 134 regulates the pressure of gaseous fuel from accumulator pressure to injection pressure in gaseous-fuel rail 140 and can allow for more precise control of injection pressure compared to the embodiment of internal combustion engine system 101 of FIG. 1 particularly when injection pressure is directly determined by pressurizer 120 in FIG. 1.

Figure 3:
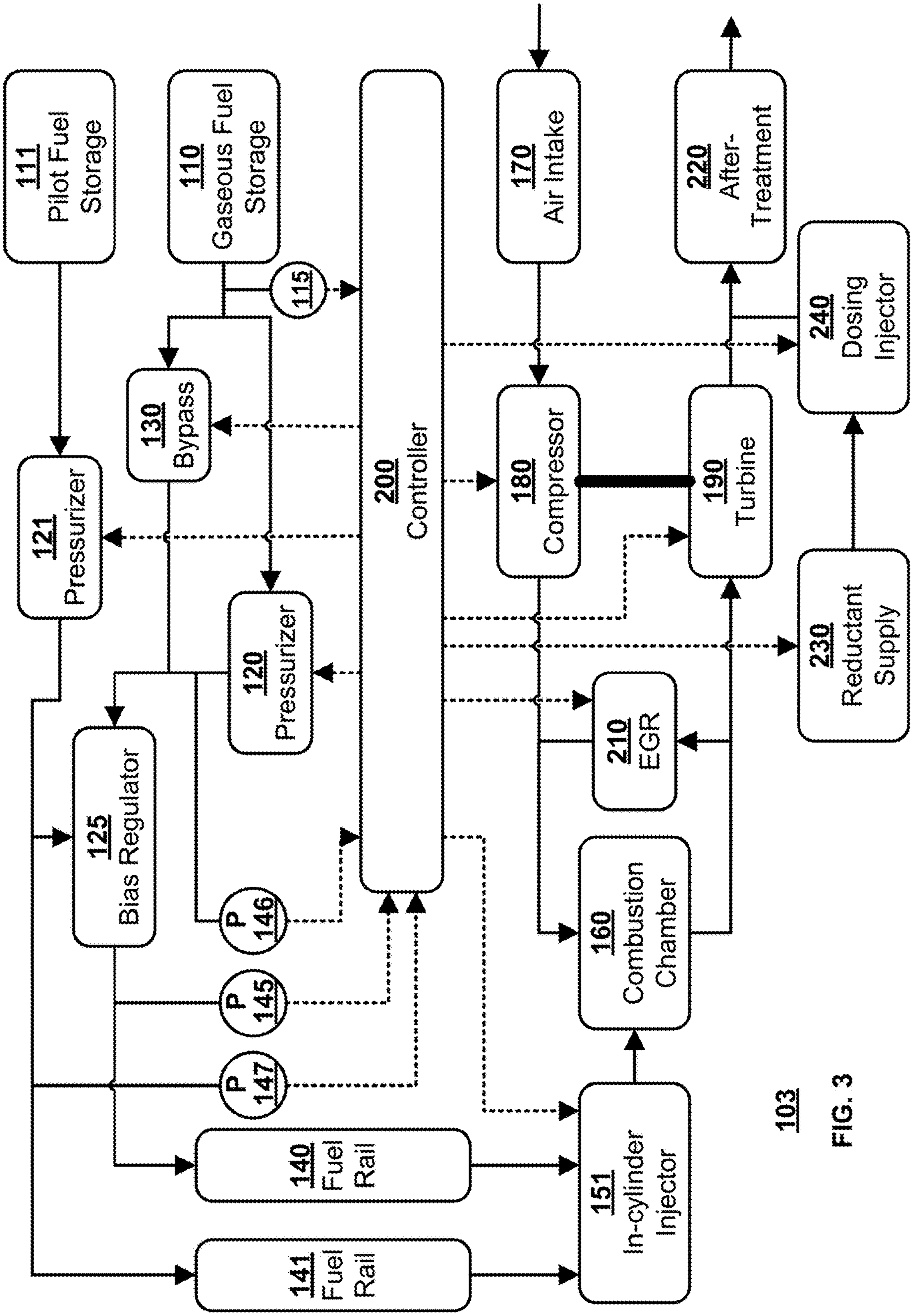
FIG. 3 is a schematic view of an internal combustion engine system according to another embodiment.

Referring now to FIG. 3, there is shown internal combustion engine system 103 according to another embodiment that regulates an injection pressure of gaseous fuel in gaseous-fuel rail 140 for injection into combustion chamber 160, which can take the mitigation of emissions generated by the internal combustion engine into consideration in the pressure regulation strategy, and which is similar to internal combustion engine systems 101 and 102 and at least differences are discussed. Internal combustion engine system 103 employs a pilot fuel to ignite the gaseous fuel in combustion chamber 160. Storage vessel 111 stores a supply of pilot fuel, such as diesel, dimethyl ether (DME), or synthetic fuels. Pressurizer 121 pressurizes the pilot fuel from pilot-fuel storage vessel 111 and the pressurized pilot fuel is fluidly communicated to differential-pressure regulator 125, also known as a bias-pressure regulator. Pressurizer 121 can include a transfer pump (often located in pilot fuel storage vessel 111), an inlet metering valve and a common rail pump, in addition to other fuel system components known to those skilled in the technology. In general, the pilot fuel has a higher cetane number than a main fuel (which is the gaseous fuel herein) for which the pilot fuel is employed to ignite. Exemplary gaseous fuels employed in GFDI engines have a relatively low cetane number compared to diesel fuel and are not auto-ignitable within the pressure and temperature environment prevailing in the latter part of the compression stroke in conventional internal combustion engines. Accordingly, the pilot fuel such as diesel fuel can be employed as an ignition source to ignite the gaseous fuel. The pilot fuel can be injected during the compression stroke into a pressure and temperature environment that causes the pilot fuel to auto-ignite and combust thereby creating another pressure and temperature environment suitable for igniting the gaseous fuel. In an exemplary embodiment the pilot fuel is injected later in the compression stroke such that the pilot fuel burns in a diffusion combustion mode. The gaseous fuel can be injected before, during and/or after the injection of the pilot fuel. In other embodiments the pilot fuel can be another gaseous fuel that has higher cetane number (compared to the gaseous fuel that needs the pilot fuel to ignite) such that the second gaseous fuel can be ignited by the pressure and temperature environment existing during the compression stroke, and more particularly in the later part of the compression stroke in conventional internal combustion engines.

Internal combustion engine system 103 can include pressure sensors 146 and 147. Pressure sensor 146 generates signals representative of gaseous fuel pressure downstream from pressurizer 120 and upstream of differential-pressure regulator 125. Pressure sensor 147 generates signals representative of pilot-fuel pressure in pilot-fuel rail 141 downstream from pressurizer 121. The signals from pressure sensors 145, 146, and 147 are sent to electronic controller 200 that determines the respective pressures they represent.

Differential-pressure regulator 125 is employed to maintain a differential pressure between pilot-fuel rail pressure in pilot-fuel rail 141 and gaseous-fuel rail pressure in gaseous-fuel rail 140 within a desired range (where pilot-fuel rail pressure is greater than gaseous-fuel rail pressure by at least a desired margin), such that the pilot fuel can be employed as a hydraulic fluid in the actuation of dual-fuel in-cylinder injector 151 and in forming liquid seals to seal the gaseous fuel within dual-fuel in-cylinder injector 151, as is known to those skilled in the technology. The differential pressure is also known as system bias pressure. U.S. Pat. No. 6,298,833, issued on Oct. 9, 2001, and owned by the Applicant, discloses various embodiments of exemplary differential-pressure regulators 125 that can be employed herein, although other techniques for maintaining a pressure bias between two fuels can also be employed. In the illustrated embodiment of FIG. 3, pressure regulator 125 is employed in a gas-follows-diesel (GFD) differential-pressure regulation strategy where pilot-fuel pressure downstream from pressurizer 121 (which is also the pilot-fuel rail pressure in pilot-fuel rail 141) is sampled by differential-pressure regulator 125 in order to regulate gaseous-fuel pressure from gaseous-fuel pressure upstream of regulator 125 as measured by pressure sensor 146 to gaseous-fuel rail pressure downstream from regulator 125 as measured by pressure sensor 145 (which is also the gaseous-fuel injection pressure in gaseous-fuel rail 140).

Dual-fuel in-cylinder injector 151 is fluidly connected with pilot-fuel rail 141 and gaseous-fuel rail 140 and is operative to separately and independently inject the pilot fuel and the gaseous fuel directly into combustion chamber 160 (through a nozzle of the fuel injector disposed in the combustion chamber). In other embodiments when the pilot fuel is another type of gaseous fuel a separate hydraulic fluid can perform the actuating and sealing functions that is otherwise performed by a liquid pilot-fuel. Rather than a dual fuel injector, a separate gaseous fuel injector and pilot fuel injector is also contemplated to separately inject the gaseous fuel and pilot fuel respectively. Electronic controller 200 is operatively connected with pressurizer 121 and fuel injector 151 to command their operation. Pilot-fuel rail pressure in pilot-fuel rail 141 is also known as pilot-fuel injection pressure, and as disclosed in previous embodiments the pressure of the gaseous fuel in gaseous-fuel rail 140 is known as gaseous-fuel injection pressure.

Figure 4:
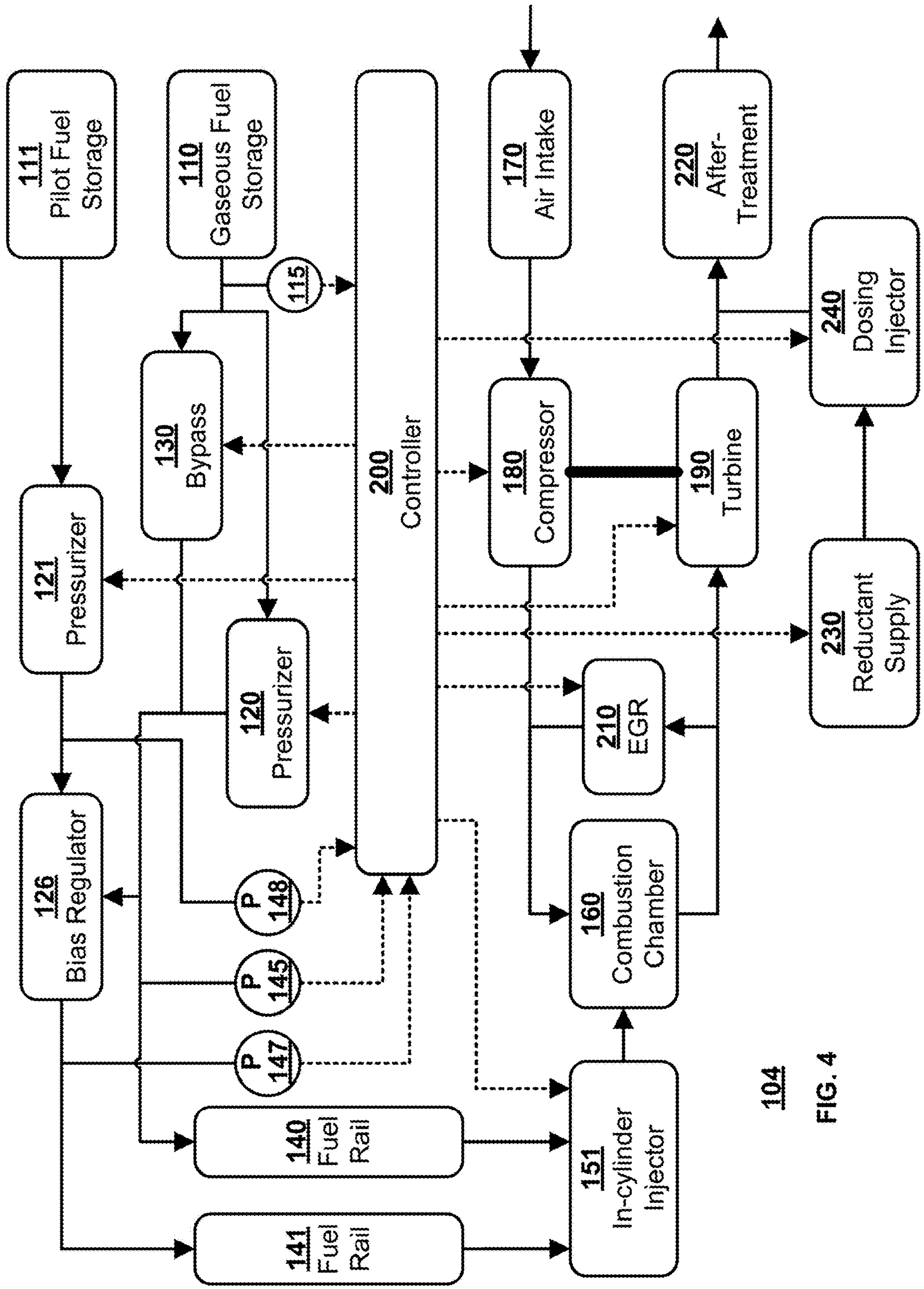
FIG. 4 is a schematic view of an internal combustion engine system according to another embodiment.

Referring now to FIG. 4, there is shown internal combustion engine system 104 according to another embodiment that regulates an injection pressure of gaseous fuel in gaseous-fuel rail 140 for injection into combustion chamber 160, which can take the mitigation of emissions generated by the internal combustion engine into consideration in the pressure regulation strategy, and which is similar to internal combustion engine systems 101, 102 and 103 and at least differences are discussed. Pressure sensor 148 generates signals representative of pilot-fuel pressure upstream of pressure regulator 126 and sends these signals to electronic controller 200 that determines the pilot-fuel pressure. Pressure regulator 126 is employed in a diesel-follows-gas (DFG) differential-pressure regulation strategy where gaseous-fuel pressure downstream from pressurizer 120 (which is also the gaseous-fuel rail pressure in gaseous-fuel rail 140) is sampled by differential-pressure regulator 126 in order to regulate pilot-fuel pressure upstream of regulator 126 as measured by pressure sensor 148 to pilot-fuel pressure downstream from regulator 126 as measured by pressure sensor 147 (which is also the pilot-fuel rail pressure in pilot-fuel rail 141).

The gaseous-fuel rail pressure (GRP) for internal combustion engine systems 101, 102, 103, and 104 is an important parameter affecting the brake thermal efficiency (BTE) of the engines in the respective systems. Compared to liquid fueled engine systems that employ a liquid fuel as the main fuel, such as diesel-fuel compression ignition engines, variations in the gaseous-fuel rail pressure have a stronger influence on the BTE of engines in systems 101, 102, 103, and 104 than variations in diesel fuel pressure have on the BTE of the diesel-fuel compression ignition engines. Typical desired injection pressures of diesel engines are on the order of 2000 bar and don't vary substantially from the desired injection pressure. Diesel fuel is an incompressible fluid that requires substantially less energy to pressurize than gaseous fuel, and for this reason desired injection pressures for gaseous fueled engines that directly inject the gaseous fuel into combustion chambers are substantially lower than the diesel-fuel compression ignition engines. For example, desired injection pressures for gaseous-fueled engines that directly inject the gaseous fuel into combustion chambers later in the compression stroke are on the order of 250 bar to 700 bar. Any changes to the gaseous-fuel injection pressure when operating within this desired injection pressure range has a greater impact on the BTE of the engine (since the penetration of gaseous-fuel jets into the combustion chamber and the mixing of gaseous fuel with intake air is affected to a greater degree) compared to the impact of BTE due to changes in diesel injection pressure.

Referring again to FIGS. 1 to 4, the gaseous fuel is stored as a compressed gas in storage vessel 110. Typical storage pressures after storage vessel 110 is filled can be 300 bar or 700 bar. In either case, as engines in the internal combustion engine systems of 101, 102, 103, and 104 consume the gaseous fuel, the instantaneous storage pressure decreases and eventually the storage pressure drops below a desired injection pressure, such as 250 bar. Pressurizer 120 can be actuated to maintain the gaseous-fuel rail pressure at 250 bar. There is a significant energetic cost to pressurizing the gaseous fuel since it is stored as a compressible fluid (that is, in the gas state), and as the storage pressure continues to decrease below 250 bar the energetic cost of pressurizing the gaseous fuel to 250 bar increases. The energetic cost of pressurizing the gaseous fuel to the desired injection pressure is also referred to as a parasitic cost to operating engines in internal combustion engine systems 101, 102, 103, and 104.

Although the reductant employed in aftertreatment 220 to mitigate emissions of nitrogen oxides (NOx) does not create heat that is put to useful work at the crankshaft and in this regard does not impact the BTE of the engine, an effective BTE can be defined that accommodates both the gaseous fuel consumed in combustion chamber(s) 160 of the internal combustion engine and the reductant consumed by aftertreatment 220. Even though the reductant doesn't create heat that is put to useful work at the crankshaft, there are still costs associated with using the reductant in internal combustion engine systems 101, 102, 103, and 104. For the purposes of discussion herein, the BTE is defined as the ratio of brake power obtained from the engine over the fuel energy supplied to the engine. The brake power of an internal combustion engine is the power available at the crankshaft and is usually measured by means of a brake mechanism. The BTE determines how efficiently the heat is converted into useful work. The BTE can be determined according to Equation 1 below where the heat put to useful work is the brake power and the heat content of the fuel consumed can be derived from the lower heating value of the fuel and the quantity of the fuel consumed. The effective BTE can be defined according to Equation 2 below where the numerator is the same as in Equation 1, and the denominator has been modified to include the heat content of an equivalent fuel consumed.

$$BTE = \frac{\text{Heat Put to Useful Work}}{\text{Heat Content of Fuel Consumed}} \quad \text{Equation 1}$$

$$BTE_e = \frac{\text{Heat Put to Useful Work}}{\text{Heat Content of Equivalent Fuel Consumed}} \quad \text{Equation 2}$$

The equivalent fuel consumed in Equation 2 above can be determined according to Equation 3 below where a quantity of the equivalent fuel is the sum of a quantity of the gaseous fuel consumed in combustion chamber(s) 160 of the internal combustion engine and a quantity of a gaseous fuel equivalent of the reductant consumed in aftertreatment 220, or a quantity of the gaseous fuel consumed for emission mitigation but not for combustion in combustion chamber(s) 160 of the internal combustion engine. The quantity $Q_{GF}$ of gaseous fuel consumed in combustion chamber 160 includes the total quantity of gaseous fuel injected or delivered into the combustion chamber, which includes the gaseous fuel combusted in the combustion chamber and the unburned gaseous fuel leaving the combustion chamber. By unburned gaseous fuel is meant gaseous fuel that should have burned in combustion chamber 160 but did not. The quantity $Q_{GF}$ of gaseous fuel consumed in combustion chamber 160 can be multiplied by the number (n) of combustion chambers in internal combustion engine similarly operating, or in other embodiments each quantity $Q_{GF}$ of gaseous fuel consumed in each combustion chamber can be accounted for individually to account for the total fuel consumed by the internal combustion engine. The quantity $Q_{GFER}$ of gaseous fuel equivalent of reductant consumed factors in the total quantity of reductant injected by dosing injector 240 or a total of the emission mitigation quantity of hydrogen when the reductant is the gaseous fuel in storage vessel 110 that is injected by in-cylinder injector 150, 151.

$$Q_{EF} = nQ_{GF} + Q_{GFER} \qquad \text{Equation 3}$$

where $Q_{EF}$=Quantity of equivalent fuel consumed by internal combustion engine in systems 101, 102, 103, 104 n=number of combustion chambers of internal combustion engine $Q_{GF}$=Quantity of gaseous fuel consumed in combustion chamber (160)

$Q_{GFER}$=Quantity of gaseous fuel equivalent of reductant consumed in aftertreatment (220)

The gaseous fuel equivalent of the reductant consumed in aftertreatment 220 in Equation 3 above can be determined according to Equation 4 below as the product of a quantity of reductant consumed in aftertreatment 220 and a conversion factor.

$$Q_{GFER} = Q_R \times CF \qquad \text{Equation 4}$$

where $Q_R$=Quantity of reductant consumed in aftertreatment (220)

CF=Conversion factor

There can be different conversion factors associated with different costs with using the reductant in internal combustion engine systems 101, 102, 103, and 104. For example, one cost associated with using the reductant is the economic cost and, in this circumstance, an economic cost conversion factor can be determined according to Equation 5 below defining an economic cost conversion factor as a price ratio between a price of reductant per unit quantity over a price of gaseous fuel per unit quantity.

$$CF_{EC} = \frac{P_R}{P_{GF}} \qquad \text{Equation 5}$$

where $P_R$=Price of reductant per unit quantity $P_{GF}$=Price of gaseous fuel per unit quantity Another cost associated with using reductant can be a production of carbon dioxide ($CO_2$), particularly when the reductant comprises urea. Urea decomposes into ammonia in the exhaust conduit between combustion chamber 160 and aftertreatment 220, and $CO_2$ is a byproduct of this decomposition. A $CO_2$ conversion factor can be determined according to Equation 6 below defining the $CO_2$ conversion factor as a ratio between a quantity of $CO_2$ produced per unit quantity of reductant consumed in aftertreatment 220 over a quantity of $CO_2$ produced per unit quantity of gaseous fuel consumed in combustion chamber 160. The unit quantity of reductant and gaseous fuel consumed in Equation 6 can have the units of grams per kilowatt-hour (g/kWh).

$$CF_{CO2} = \frac{Q_{R-CO2}}{n(Q_{GF-CO2})} \qquad \text{Equation 6}$$

where $Q_{R-CO2}$=Quantity of $CO_2$ produced per unit quantity of reductant consumed in aftertreatment 220

$Q_{GF-CO2}$=Quantity of $CO_2$ produced per unit quantity of gaseous fuel consumed in combustion chamber 160 n=number of combustion chambers of internal combustion engine

Figure 5:
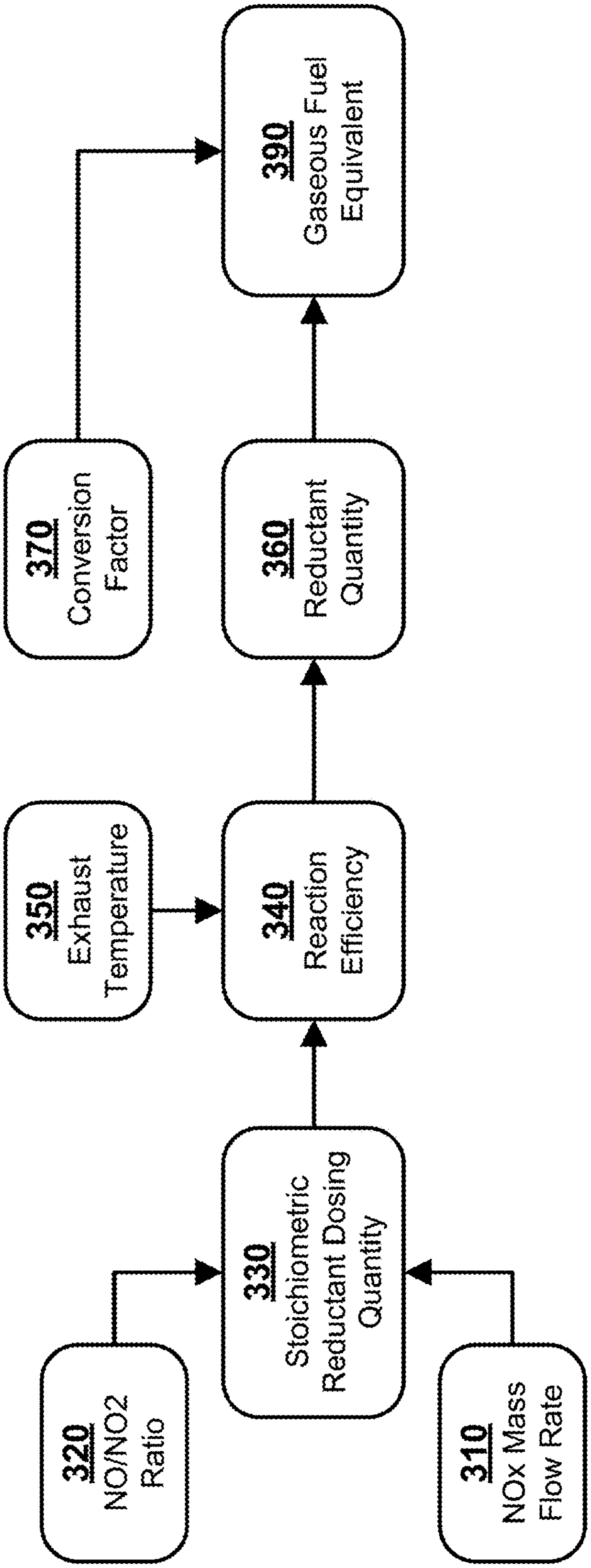
FIG. 5 is a flow chart view of an algorithm for determining a gaseous fuel equivalent of a reductant.

There is an energetic cost associated with consuming reductant in aftertreatment 220. An energy equivalent conversion factor can be determined according to equation 7 below defining the energy equivalent conversion factor as a ratio between a lower heating value of the reductant over a lower heating value of the gaseous fuel.

$$CF_{EE} = \frac{LHV_R}{LHV_{GF}} \qquad \text{Equation 7}$$

where $LHV_R$=Lower heating value of reductant $LHV_{GF}$=Lower heating value of gaseous fuel consumed Referring now to FIG. 5 there is shown a flow chart of an algorithm 300 for determining the quantity of gaseous fuel equivalent of reductant consumed in aftertreatment 220 in more detail. Internal combustion engines of respective engine systems 101, 102, 103, and 104 generate a NOx mass flow rate 310 emanating from combustion chamber 160 when in operation, and more particularly the NOx mass flow rate downstream from turbine apparatus 190 going into aftertreatment 220, that can be characterized by a ratio 320 between a quantity of nitric oxide (NO) over a quantity of nitrogen dioxide ($NO_2$). The NOx mass flow rate 310 can be determined empirically through operating the engine over an engine map including a plurality of engine load and engine speed conditions and measuring the NOx mass flow rate at various engine load and speed conditions, and/or analytically based upon models and equations associated with combustion in combustion chamber 160, as would be known by those familiar with the technology. The NO/$NO_2$ ratio 320 is employed to determine the amount of ammonia (when the reductant comprises urea) required to obtain a stoichiometric reductant dosing quantity 330. A reaction efficiency 340 is determined based on inputs of an exhaust temperature 350 and the stoichiometric reductant dosing quantity 330, which yields a reductant quantity 360 associated with mitigating NOx emissions. The quantity of gaseous fuel equivalent 390 can be determined, according to Equation 4 above, based on the reductant quantity 360 and conversion factor 370 where the conversion factor 370 is determined according to anyone of Equations 5, 6, and 7 above. In those embodiments where the reductant is urea it can be part of a diesel emission fluid (DEF) which is an aqueous solution or mixture comprised of urea and deionized water, where the DEF can be stored in reductant supply 230 (seen in FIGS. 1 to 4). A quantity of DEF can be determined based on reductant quantity 360 and a mixture ratio of urea to deionized water in the DEF, and the quantity of DEF can be considered an effective reductant quantity in Equation 4 above, and accordingly the price of reductant in Equation 5 is the price of DEF.

Figure 6:
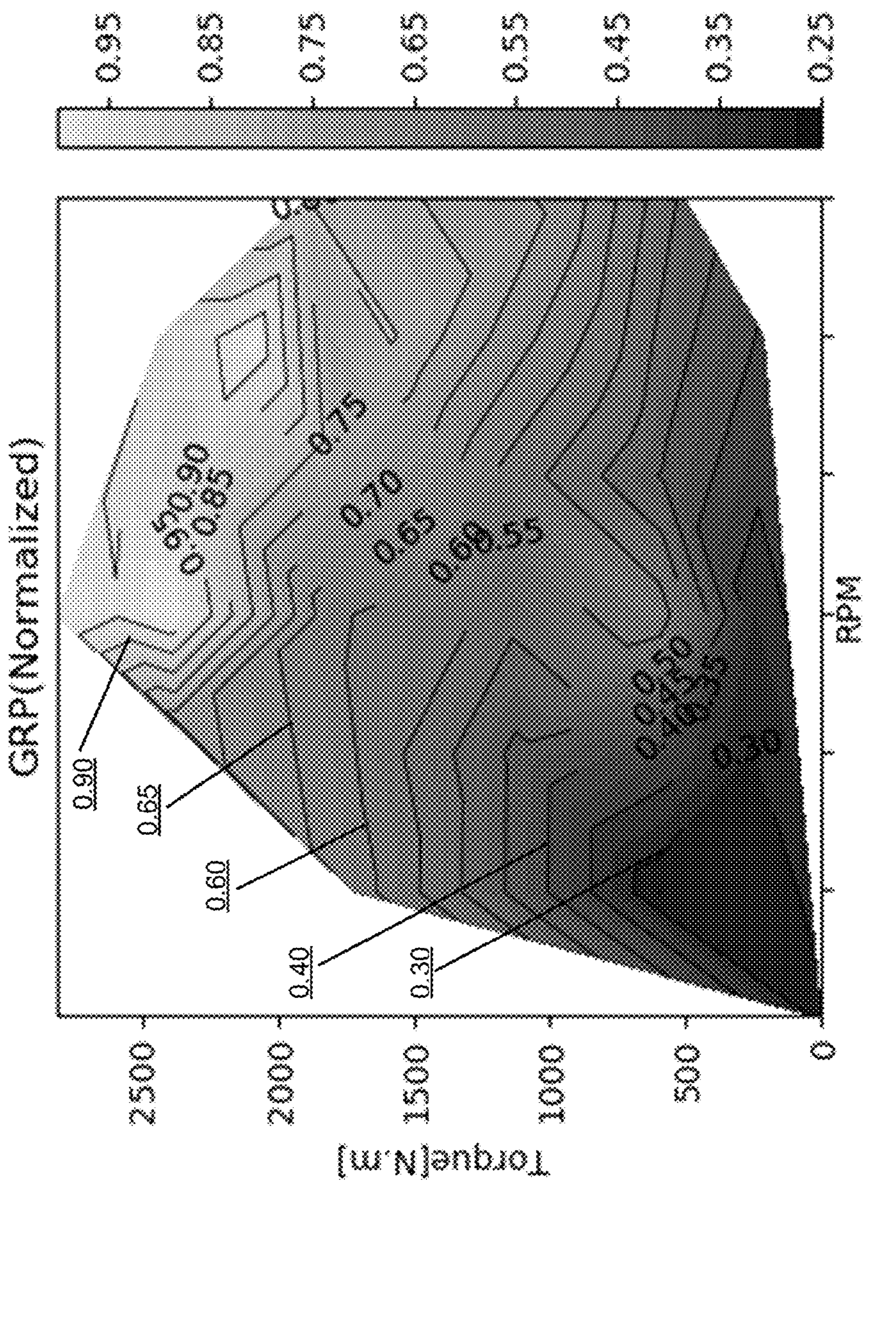
FIG. 6 is a chart view of a normalized gaseous-fuel rail pressure (also known as an injection pressure) based on engine speed (RPM) and engine load (torque) where each operating point defined by an engine load and an engine speed represents the gaseous-fuel rail pressure at a respective optimum brake thermal efficiency for that operating point.
Figure 7:
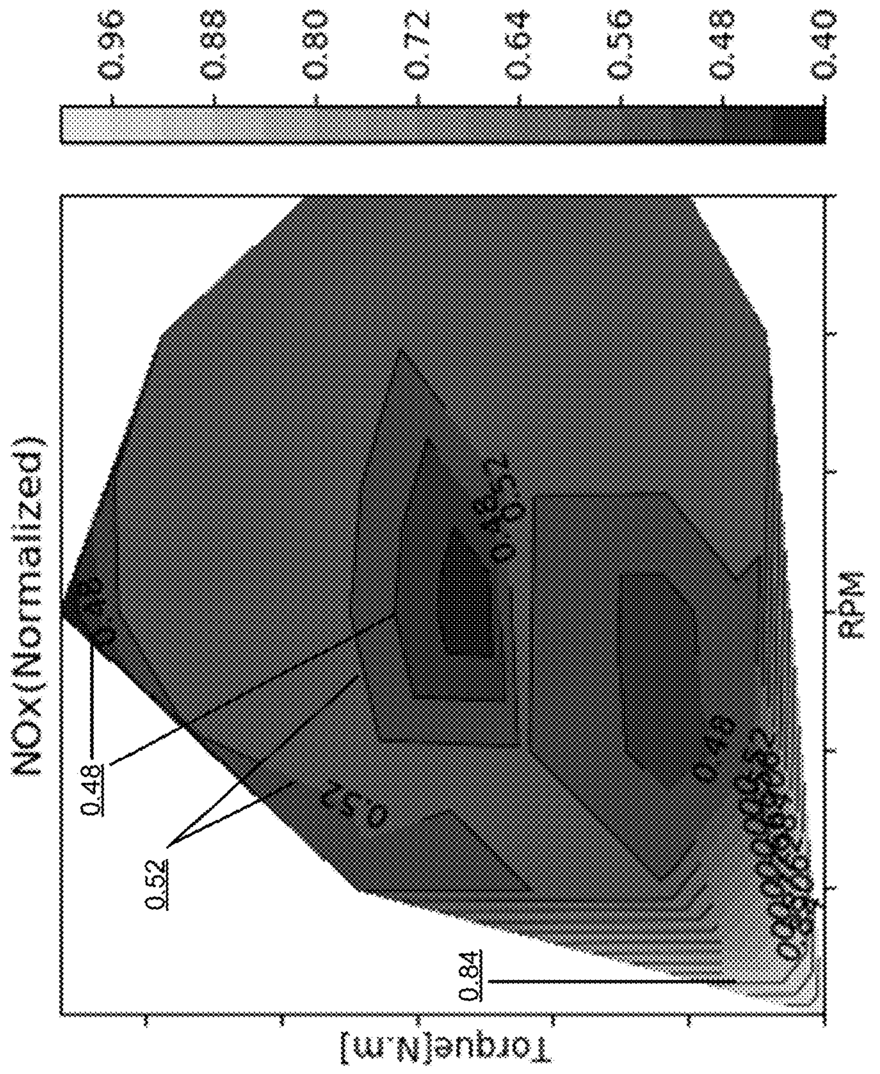
FIG. 7 is a chart view of normalized NOx emissions based on engine speed (RPM) and engine load (torque) where each operating point defined by an engine load and an engine speed represents the NOx emissions while operating at the gaseous-fuel rail pressure for that operating point shown in FIG. 6.
Figure 8:
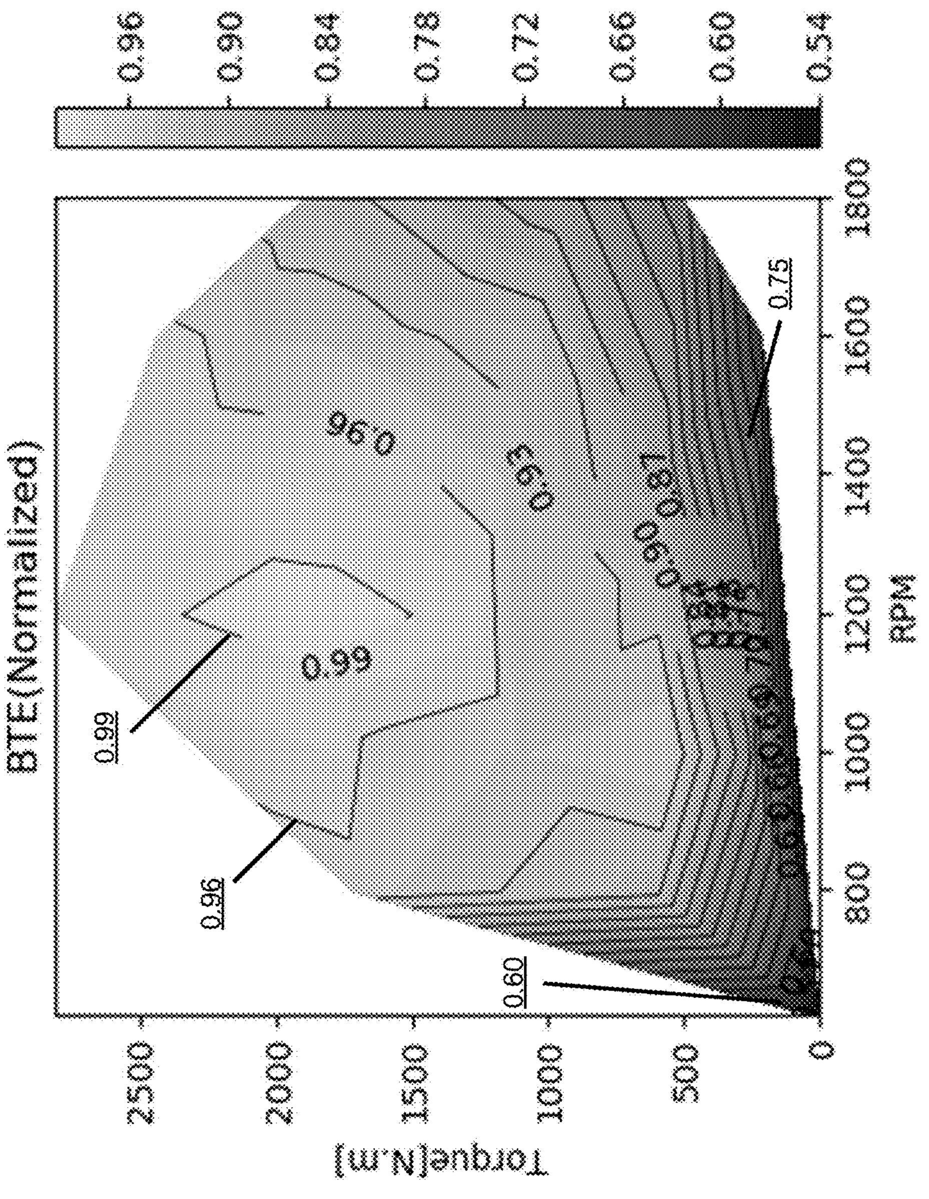
FIG. 8 is a chart view of normalized brake thermal efficiency (BTE) based on engine speed (RPM) and engine load (torque) where each operating point defined by an engine load and an engine speed represents the optimum BTE while operating at the gaseous-fuel rail pressure for that operating point shown in FIG. 6.
Figure 9:
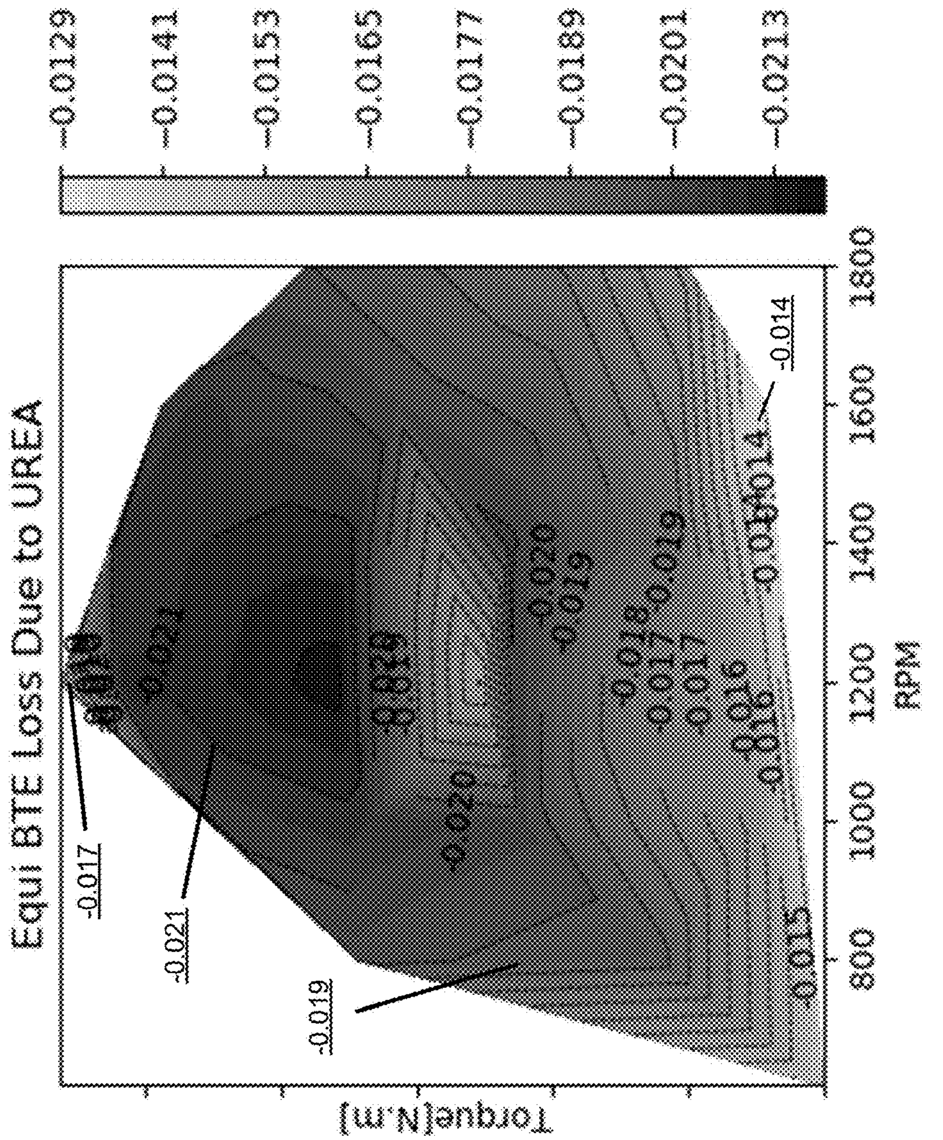
FIG. 9 is a chart view of normalized brake thermal efficiency loss based on engine speed (RPM) and engine load (torque) where each operating point defined by an engine load and an engine speed represents the BTE loss due to employing a reductant for emissions mitigation, where the reductant increases a quantity of gaseous-fuel equivalent, while operating at the gaseous-fuel rail pressure for that operating point shown in FIG. 6.

Referring now to FIGS. 6 to 9 there is illustrated efficiency maps for internal combustion engines of respective engine systems 101, 102, 103, and 104. The efficiency maps are generated either using analytical models or empirically by taking measurements while operating the engines of respective engine systems 101, 102, 103, and 104 over a full range of engine speed and engine load conditions. Each of the efficiency maps represents the value of respective parameters while operating at the optimal BTE for respective engine speed and engine load conditions. For example, FIG. 6 illustrates a value of gaseous-fuel rail pressure for the optimal BTE for each engine speed and engine load (torque) condition where the value of the gaseous-fuel rail pressure is indicated by gradient lines (and the grey scale); FIG. 7 illustrates a value of NOx for each engine speed and engine load (torque) condition while operating with the gaseous-fuel rail pressure for the optimal BTE at those conditions; FIG. 8 illustrates the optimal BTE for each engine speed and engine load (torque) condition; and FIG. 9 illustrates a difference between the effective BTE and the BTE for each engine speed and engine load (torque) condition when the consumption of reductant is factored into the determination of the effective BTE using, for example, the economic cost conversion factor. The NOx values in FIG. 7 represents the NOx value for the gaseous-fuel rail pressure (for each engine speed and engine load condition) that generates the optimal BTE.

Figure 10:
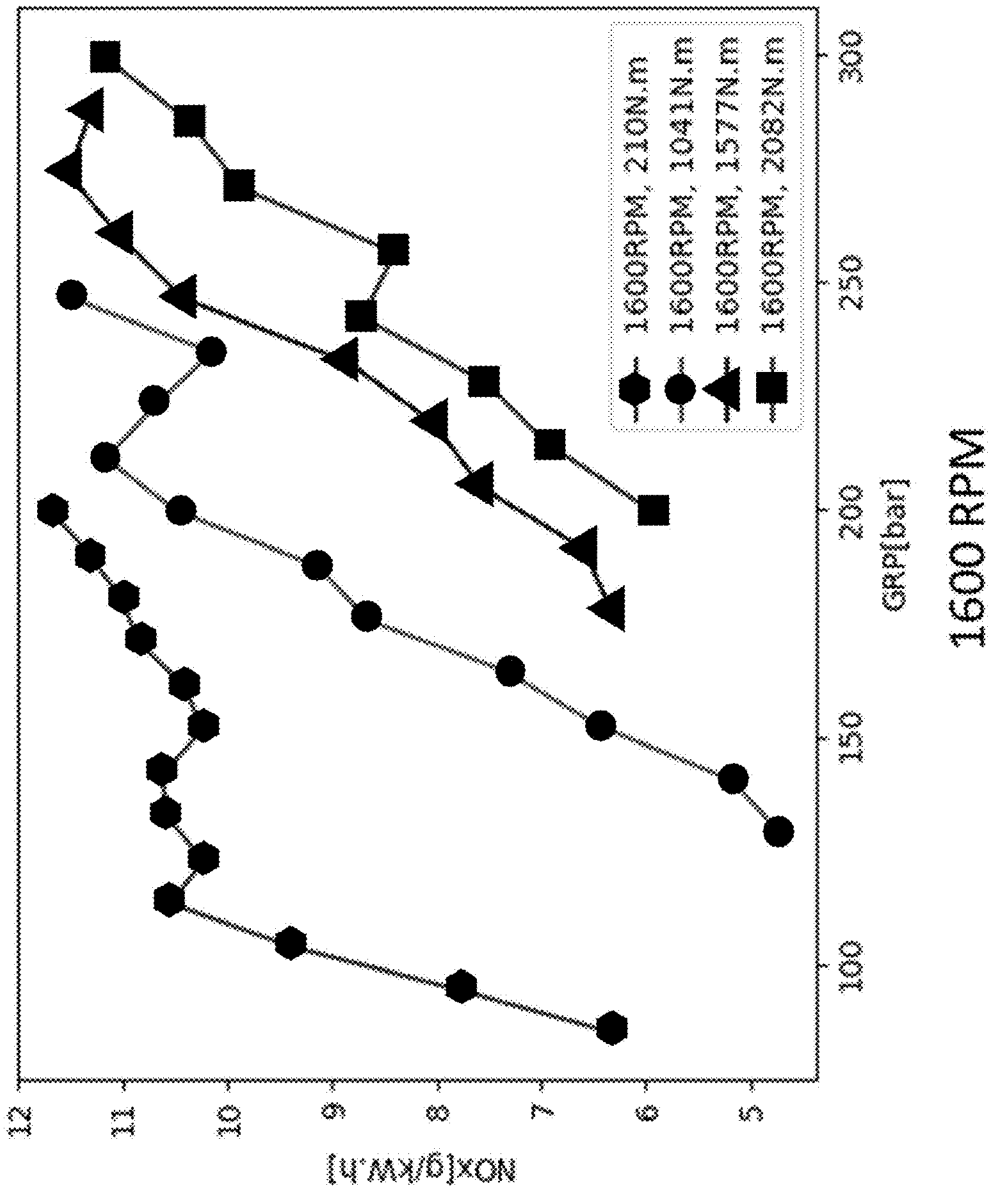
FIG. 10 is a chart view of NOx emissions based on gaseous-fuel rail pressure (GRP) for an engine speed of 1600 RPM and a variety of engine load conditions (torque) including 210 Nm, 1041 Nm, 1577 Nm, and 2082 Nm.
Figure 11:
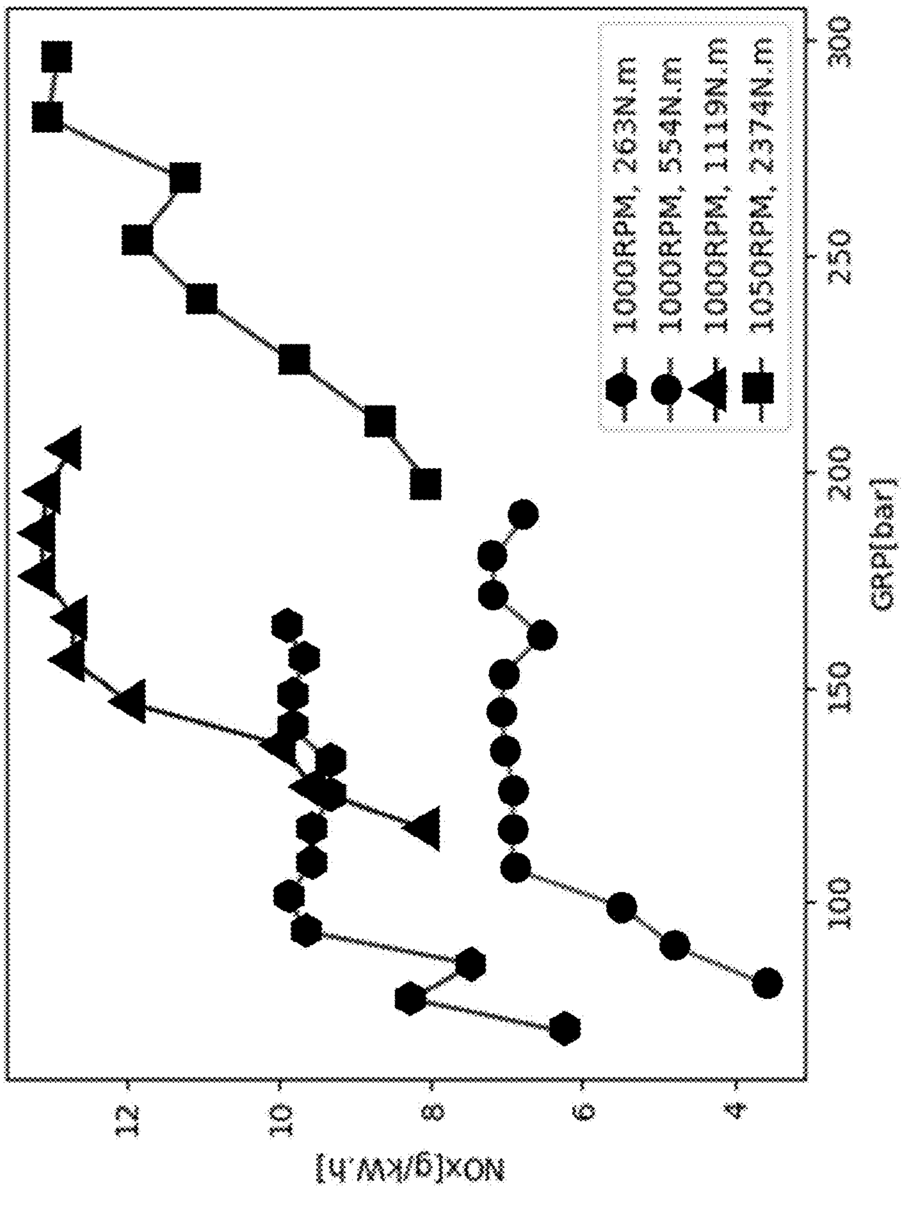
FIG. 11 is a chart view of NOx emissions based on gaseous-fuel rail pressure (GRP) for an engine speed of 1000 RPM and a variety of engine load conditions (torque) including 263 Nm, 554 Nm, 1119 Nm, and 2374 Nm.
Figure 12:
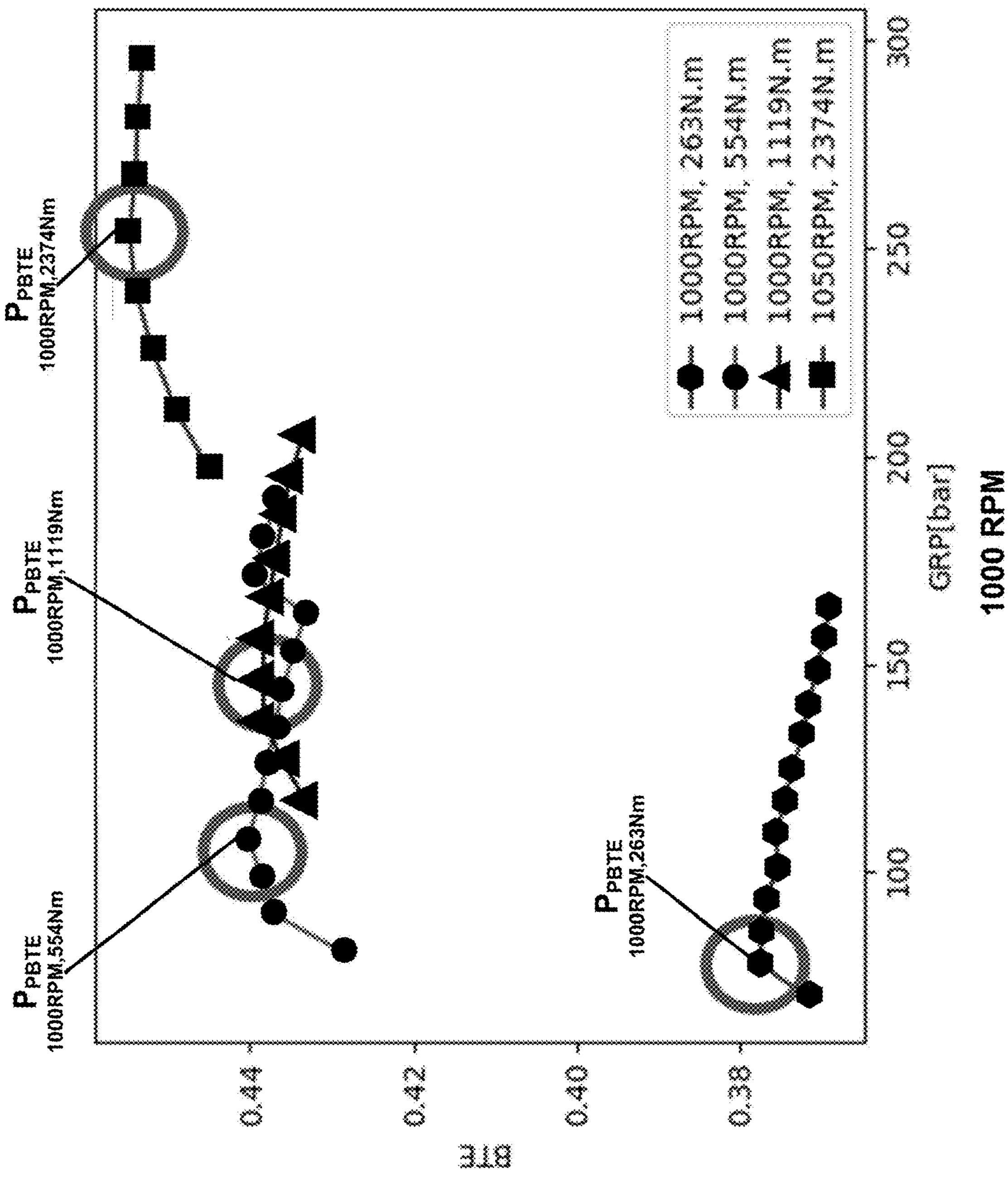
FIG. 12 is a chart view of BTE based on gaseous-fuel rail pressure (GRP) for an engine speed of 1000 RPM and a variety of engine load conditions (torque) including 263 Nm, 554 Nm, 1119 Nm, and 2374 Nm.
Figure 13:
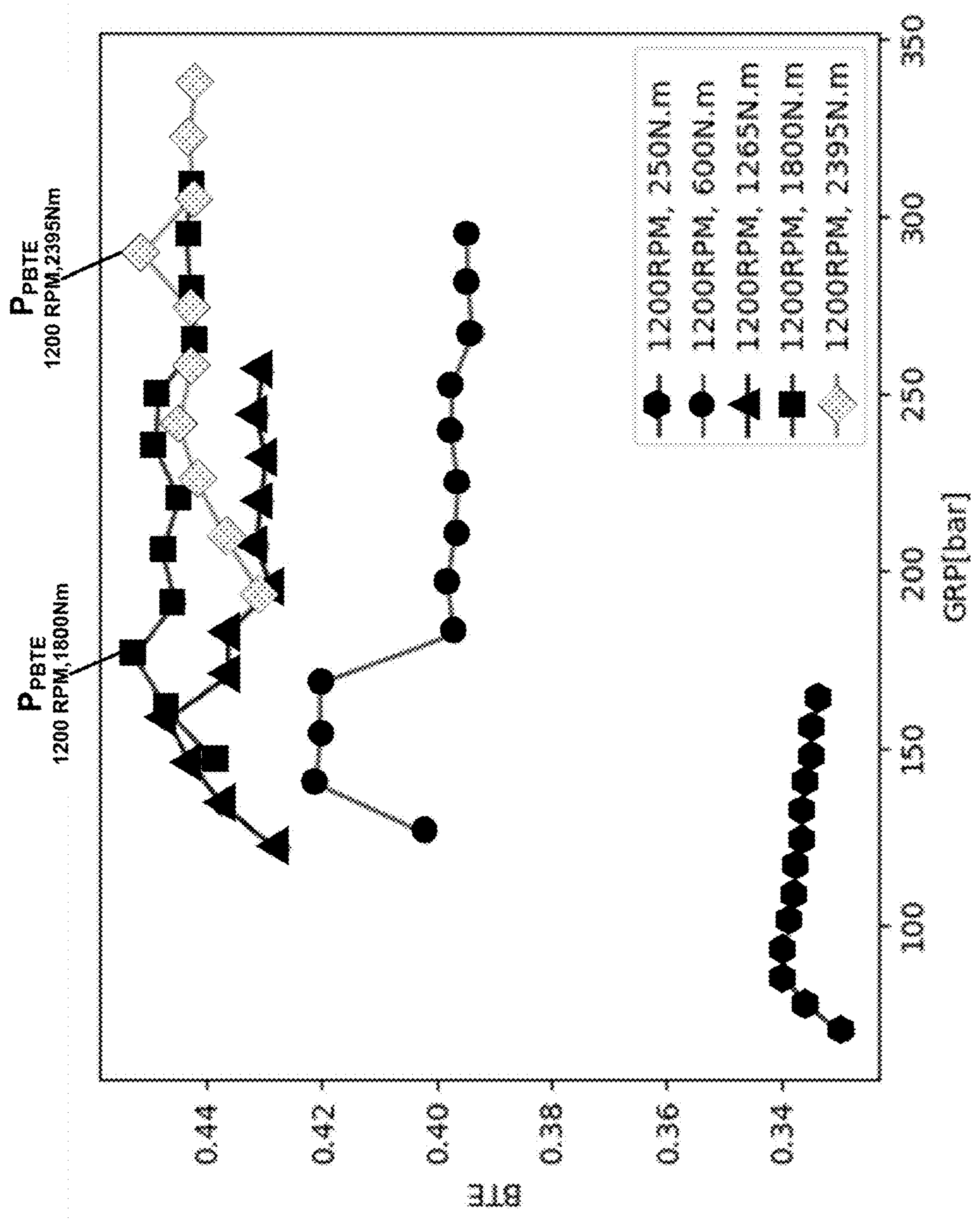
FIG. 13 is a chart view of BTE based on gaseous-fuel rail pressure (GRP) for an engine speed of 1200 RPM and a variety of engine load conditions (torque) including 250 Nm, 600 Nm, 1265 Nm, 1800 Nm, and 2395 Nm.
Figure 14:
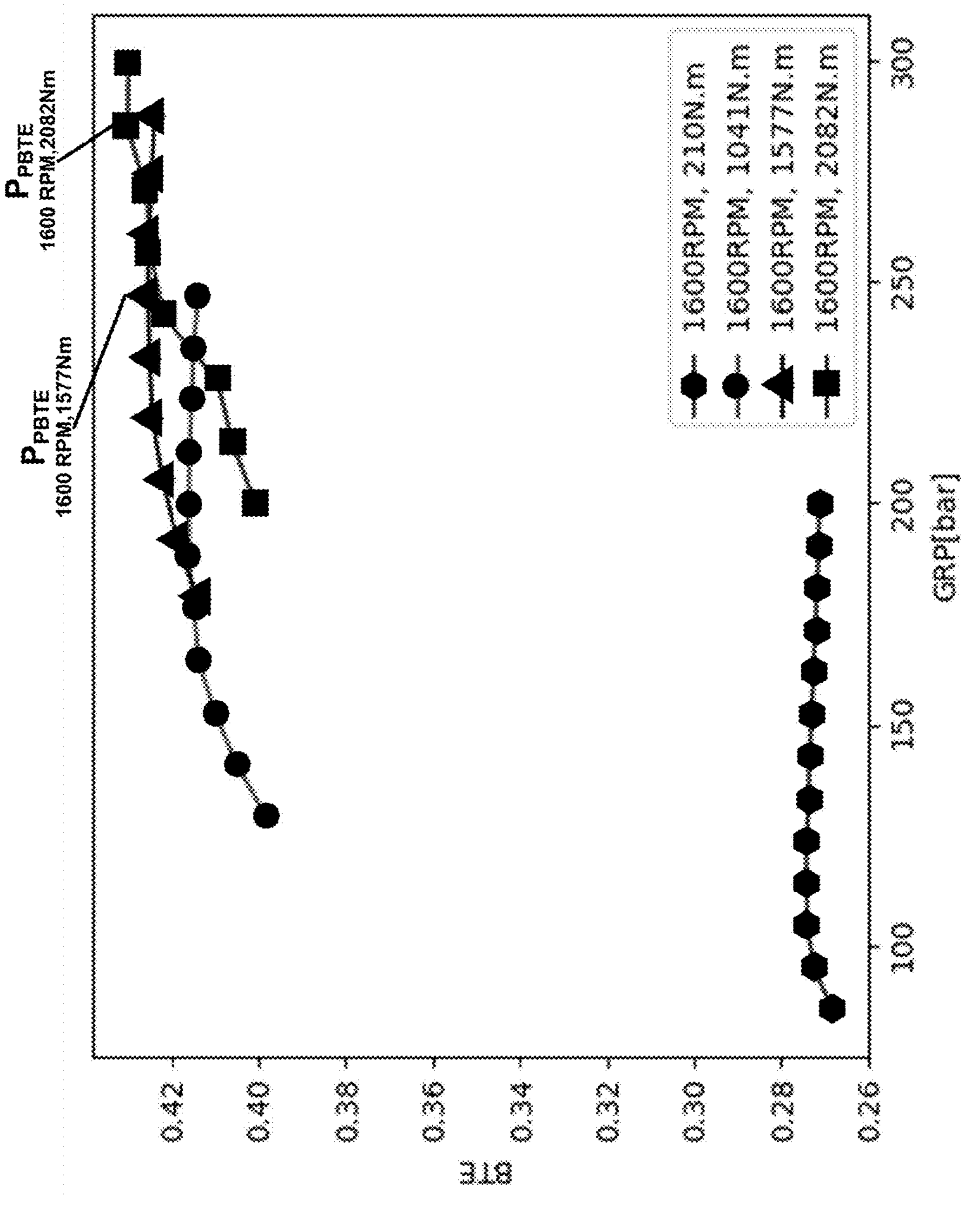
FIG. 14 is a chart view of BTE based on gaseous-fuel rail pressure (GRP) for an engine speed of 1600 RPM and a variety of engine load conditions (torque) including 210 Nm, 1041 Nm, 1577 Nm, and 2082 Nm.

Referring now to FIGS. 10 and 11, for each engine speed and engine load condition, the sensitivity of NOx to changes in gaseous-fuel rail pressure (GRP) can be determined. With reference to FIG. 10, plots of the sensitivity of NOx to changes in gaseous-fuel rail pressure at an engine speed of 1600 RPM are illustrated for a variety of engine loads (torques), and in FIG. 11 plots of the sensitivity of NOx to changes in gaseous-fuel rail pressure at an engine speed of 1000 RPM are illustrated for a variety of engine loads (torques). The effective BTE corrected for consumption of reductant to mitigate NOx (that is, a NOx corrected BTE) can be determined based on the sensitivity of NOx to the gaseous-fuel rail pressure. With reference to FIG. 12, plots of the effective BTE (that is, the NOx corrected BTE) to changes in the gaseous-fuel rail pressure at an engine speed of 1000 RPM are illustrated for a variety of engine loads (torques); and in FIG. 13 plots of the effective BTE to changes in the gaseous-fuel rail pressure at an engine speed of 1200 RPM are illustrated for a variety of engine loads (torques); and in FIG. 14 plots of the effective BTE to changes in the gaseous-fuel rail pressure at an engine speed of 1600 RPM are illustrated for a variety of engine loads (torques).

Figure 15:
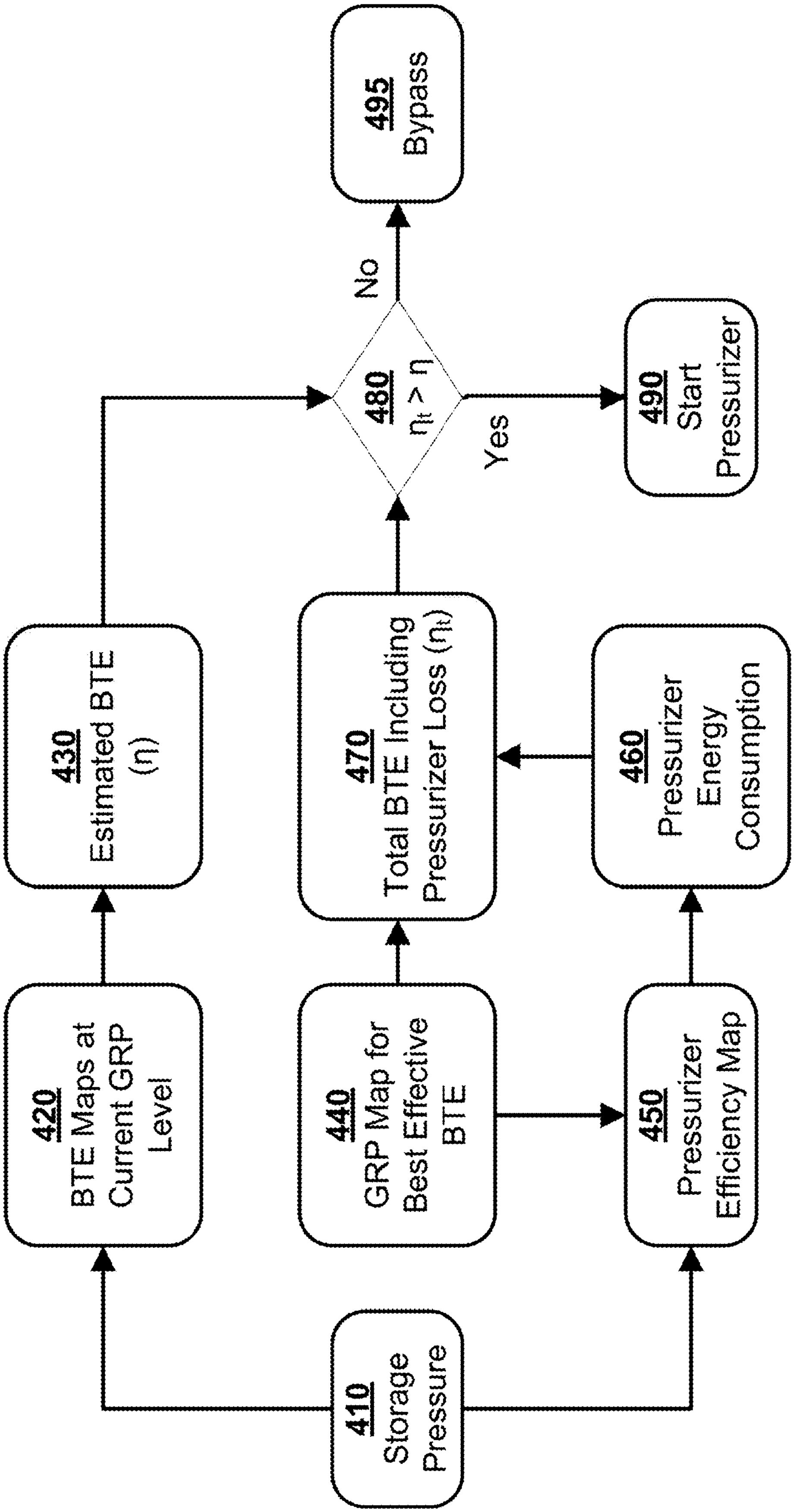
FIG. 15 is flow chart view of an algorithm for determining whether to pressurize a gaseous fuel from a storage vessel or not.

Referring now to FIG. 15 there is shown a flow chart for an algorithm 400 regulating the injection pressure in gaseous-fuel rail 140 for internal combustion engines of engine systems 101, 102, 103, and 104 and for making a determination as to whether to start pressurizer 120 (seen in FIGS. 1 to 4). As previously discussed, the storage pressure of gaseous fuel in storage vessel 110 (seen in FIGS. 1 to 4) decreases as internal combustion engines of engine systems 101, 102, 103, and 104 consume the gaseous fuel in combustion chamber 160. The efficiency maps in FIGS. 6 to 9 can be programmed into lookup tables or matrices that are often referred to as maps that have either two or three variables as input and an output variable representative of an engine parameter. A storage-pressure effective BTE 430 can be determined by inputting storage pressure 410 along with the engine speed and engine load into a BTE map 420 where the gaseous-fuel rail pressure (that is, the injection pressure) is equal to the storage pressure 410, and where the storage-pressure effective BTE 430 is also represented by variable n. Algorithm 400 can determine a second-pressure effective BTE 470, as an alternative to the storage-pressure effective BTE 430, where for the second-pressure effective BTE the gaseous fuel is pressurized to a second injection pressure 440 that is greater than the storage pressure 410. The second injection pressure 440 can be determined by inputting the engine speed and engine load into a map that outputs the optimal gaseous-fuel rail pressure for that condition. Algorithm 400 continues with the following steps when the second injection pressure 440 is greater than the storage pressure 410. An energy consumption 460 of the pressurizer 120 (seen in FIGS. 1 to 4) is determined based on a pressurizer efficiency map 450 that receives as input the storage pressure 410 and the second injection pressure 440. The second-pressure effective BTE 470 is determined based on the second injection pressure 440 and the energy consumption 460 of the pressurizer 120, where the second-pressure effective BTE 470 is also represented by variable nt. In step 480, the second-pressure effective BTE $\eta_t$ is compared to the storage-pressure effective BTE n. In step 490 the pressurizer 120 is started when the second-pressure effective BTE $\eta_t$ is greater than the storage-pressure effective BTE $\eta$, otherwise in step 495 the gaseous fuel from storage vessel 110 is fluidly communicated through bypass valve 130 (seen FIGS. 1 to 4) and is not pressurized before delivering it to the gaseous-fuel rail 140.

Figure 16:
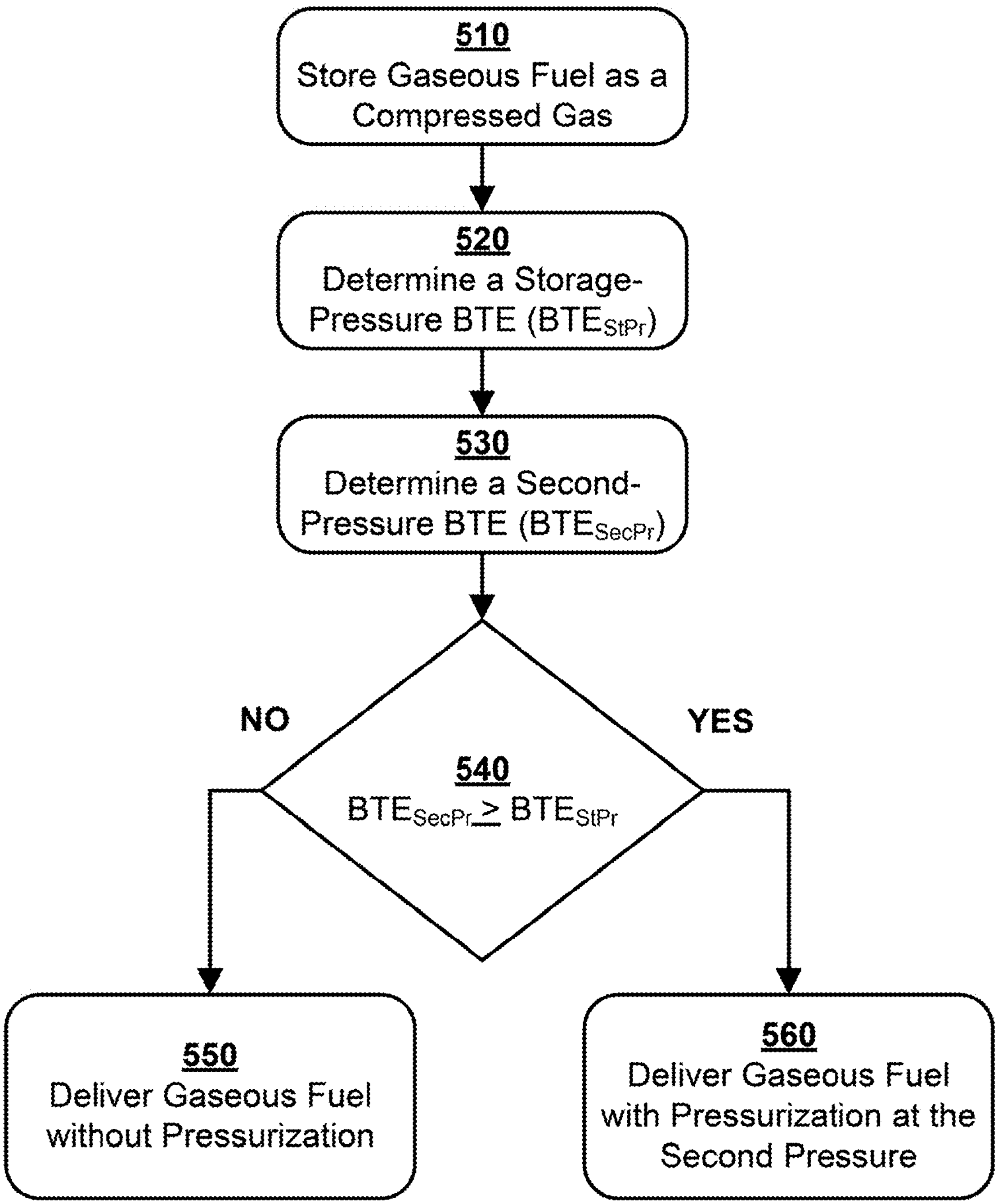
FIG. 16 is flow chart view of another algorithm for determining whether to pressurize a gaseous fuel from a storage vessel or not.

Another algorithm 500 is shown in FIG. 16 for regulating an injection pressure of gaseous fuel for direct injection into combustion chamber 160 that can take the mitigation of emissions generated by internal combustion engines in respective engine systems 101, 102, 103, and 104 into consideration in the pressure regulation strategy, and determines whether to start pressurizer 120 (seen in FIGS. 1 to 4). The algorithm 500 can determine an improved gaseous-fuel rail pressure operating condition based on the BTE according to Equation 1 above or based on the effective BTE according to Equation 2 above. In step 510, the gaseous fuel is stored as a compressed gas in storage vessel 110 (seen in FIGS. 1 to 4). In step 520, a storage-pressure BTE is determined using either Equation 1 or Equation 2, where the injection pressure is equal to the storage pressure. In step 530, a second-pressure BTE is determined using either Equation 1 or Equation 2, where the injection pressure is equal to a second pressure that is greater than the storage pressure. Preferably, the same equation (either Equation 1 or Equation 2) is employed to calculate the storage-pressure BTE and the second-pressure BTE. The second-pressure BTE can take into consideration the energetic cost of pressurizing the gaseous fuel from the storage pressure to the second pressure. Operating pressurizer 120 decreases the BTE of the engine since some of the heat generated by combusting the gaseous fuel in combustion chamber 160 is used for operating pressurizer 120 instead of, for example, turning the wheels of a vehicle propelled by internal combustion engines of engine systems 101, 102, 103, or 104, thereby reducing the heat of combustion put to useful work, which in this context is defined as propelling the vehicle. In step 540 a comparison is made between the storage-pressure BTE and the second-pressure BTE. In step 550, the gaseous fuel is delivered through bypass valve 130 (seen in FIGS. 1, 2, 3, and 4) without pressurization (bypassing pressurizer 120), when the storage-pressure BTE (520) is greater than or equal to the second-pressure BTE. In step 560, the gaseous fuel is delivered through pressurizer 120 where the gaseous fuel is pressurized from the storage pressure to the second pressure when the storage-pressure BTE is less than the second-pressure BTE. When Equation 2 is employed in algorithm 500, Equations 5, 6, or 7 can be employed to determine the conversion factor in Equation 4.

Figure 17:
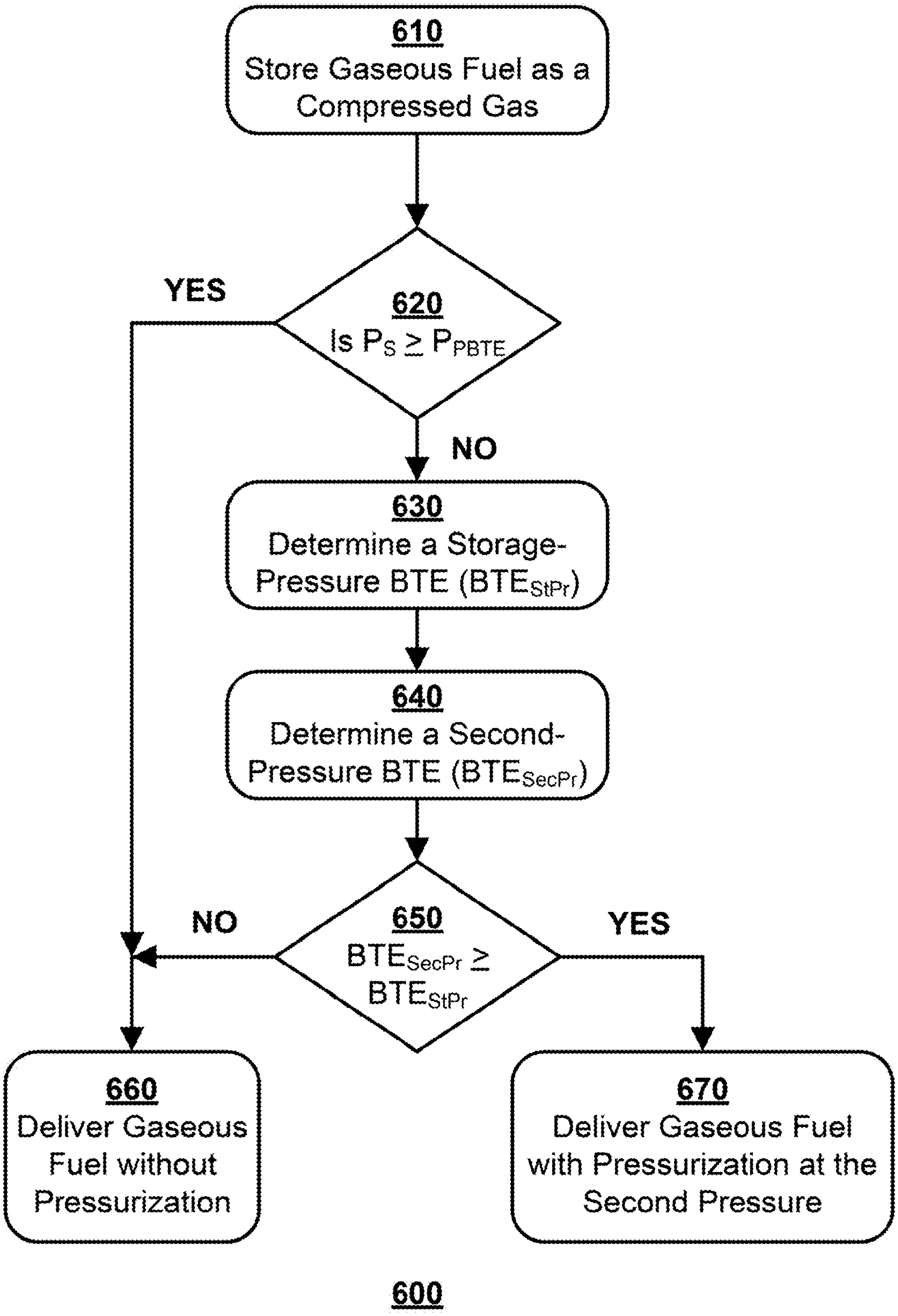
FIG. 17 is flow chart view of another algorithm for determining whether to pressurize a gaseous fuel from a storage vessel or not.

Referring now to FIG. 17, there is shown algorithm 600 for regulating an injection pressure of gaseous fuel for direct injection into combustion chamber 160 that can take the mitigation of emissions generated by internal combustion engines in engine systems 101, 102, 103, and 104 into consideration in the pressure regulation strategy, and determines whether to start pressurizer 120 (seen in FIGS. 1 to 4). The algorithm 600 can determine an improved gaseous-fuel rail pressure operating condition based on the BTE according to Equation 1 above or based on the effective BTE according to Equation 2 above. In step 610, the gaseous fuel is stored as a compressed gas in storage vessel 110 (seen in FIGS. 1 to 4). In step 620 storage pressure, $P_S$ in storage vessel 110 is compared to a peak BTE pressure $P_{PBTE}$, which is illustrated in FIGS. 12, 13, and 14 for a variety of engine speeds and engine loads. Preferably, the peak BTE pressure $P_{PBTE}$ selected for step 620 is one associated with a high engine speed and high engine load since internal combustion engines in engine systems 101, 102, 103, and 104 consume a large amount of the gaseous fuel under these conditions such that it is desirable to operate at an improved BTE in this region of operation. In step 660, the gaseous fuel from storage vessel 110 is delivered through bypass valve 130 (seen in FIGS. 1, 2, 3, and 4) without pressurization (bypassing pressurizer 120), when storage pressure $P_S$ is greater than or equal to the peak BTE pressure $P_{PBTE}$. The algorithm continues to step 630 when storage pressure $P_S$ is not greater than the peak BTE pressure $P_{PBTE}$. In step 630, a storage-pressure BTE is determined using either Equation 1 or Equation 2, where the injection pressure is equal to the storage pressure. In step 640, a second-pressure BTE is determined using either Equation 1 or Equation 2, where the injection pressure is equal to a second pressure that is greater than the storage pressure. The second pressure can be the peak BTE pressure $P_{PBTE}$ or other pressures that are greater than the storage pressure. The second-pressure BTE can take into consideration the energetic cost of pressurizing the gaseous fuel from the storage pressure to the second pressure, similarly to step 530 in algorithm 500 in FIG. 16. Preferably, the same equation (either Equation 1 or Equation 2) is employed to calculate the storage-pressure BTE and the second-pressure BTE. In step 650, a comparison is made between the storage-pressure BTE and the second-pressure BTE. In step 660, the gaseous fuel is delivered through bypass valve 130 (seen in FIGS. 1, 2, 3, and 4) without pressurization (bypassing pressurizer 120), when the storage-pressure BTE is greater than or equal to the second-pressure BTE. In step 670, the gaseous fuel is delivered through pressurizer 120 where the gaseous fuel is pressurized from the storage pressure to the second pressure when the storage-pressure BTE is less than the second-pressure BTE. When Equation 2 is employed in algorithm 600, Equations 5, 6 or 7 can be employed to determine the conversion factor in Equation 4. When the storage pressure $P_S$ is greater than the peak BTE pressure $P_{PBTE}$, internal combustion engines of engine systems 101, 102, 103, and 104 operate with a sufficiently optimal and preferably optimal BTE such that improvements in BTE are not gained by pressurizing the gaseous fuel above the storage pressure. When the injection pressure equals the storage pressure, internal combustion engines in engine systems 101, 102, 103, and 104 begin operating at a reduced BTE due to a sub-optimal injection pressure when the storage pressure $P_S$ drops below the peak BTE pressure $P_{PBTE}$. However, improvements in the BTE are not necessarily made by pressurizing the gaseous fuel from an injection pressure with a sub-optimal BTE to an injection pressure with an optimal BTE due to parasitic losses from operating a compressor or pump (that is, pressurizer 120), which requires energy to pressurize the gaseous fuel. Instead, improvements in the BTE can be made by pressurizing only after the storage pressure $P_S$ has fallen a sufficient level below the peak BTE pressure $P_{PBTE}$ whereby the loss in the BTE due to a sub-optimal injection pressure is greater than the BTE loss resulting from operating the compressor.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An internal combustion engine system fueled with a gaseous fuel comprising:

a storage vessel storing the gaseous fuel in a gas state as a compressed gas at a storage pressure, the storage pressure decreasing as an internal combustion engine consumes the gaseous fuel;

a pressurizer in fluid communication with the storage vessel for pressurizing the gaseous fuel above the storage pressure;

a bypass valve in fluid communication with the storage vessel and operable between an open position allowing flow of gaseous fuel therethrough bypassing the pressurizer and a closed position blocking flow of the gaseous fuel therethrough;

a gaseous-fuel rail in fluid communication with the pressurizer and the bypass valve to receive the gaseous fuel;

a first pressure sensor generating signals representative of a storage pressure of the gaseous fuel in the storage vessel;

a second pressure sensor generating signals representative of an injection pressure of the gaseous fuel in the gaseous-fuel rail;

a controller operatively connected with the pressurizer, the bypass valve, and the first and second pressure sensors, the controller programmed to:

receive the signals from the first and second pressure sensors and determine the storage pressure and the injection pressure respectively;

selectively command the pressurizer to pressurize the gaseous fuel from the storage pressure to a second pressure in the fuel rail; and selectively command the bypass valve between the closed position and the open position;

for an engine speed and an engine load condition the controller is further programmed to:

determine a storage-pressure brake thermal efficiency based on the injection pressure where the gaseous fuel is delivered to the fuel rail without increasing gaseous fuel pressure from the storage pressure whereby the injection pressure of the gaseous fuel is equal to the storage pressure of the gaseous fuel within a first margin;

determine a second-pressure brake thermal efficiency based on the injection pressure and an energy cost of pressurizing the gaseous fuel from the storage pressure to the second pressure whereby the injection pressure is equal to the second pressure within a second margin;

command the pressurizer to pressurize the gaseous fuel from the storage pressure to the second pressure in the fuel rail when the second-pressure brake thermal efficiency is greater than the storage-pressure brake thermal efficiency; and command the bypass valve to the open position when the second-pressure brake thermal efficiency is less or equal to the storage-pressure brake thermal efficiency.

2. The internal combustion engine system as claimed in claim 1, further comprising an in-cylinder injector operatively connected with the controller and in fluid communication with the gaseous-fuel rail to receive the gaseous fuel and to directly inject the gaseous fuel into a combustion chamber of the internal combustion engine, the controller programmed to selectively actuate the in-cylinder injector to introduce the gaseous fuel into the combustion chamber.

3. The internal combustion engine system as claimed in claim 1, wherein the determination of the second-pressure brake thermal efficiency includes an energetic cost of pressurizing the gaseous fuel from the storage pressure to the second pressure.

4. The internal combustion engine system as claimed in claim 1, wherein the second pressure is one of a plurality of pressures above the storage pressure, the controller is further programmed to determine respective brake thermal efficiencies for each pressure in the plurality of pressures, where each brake thermal efficiency is based on a respective one of the plurality of pressures and a respective energetic cost of pressurizing the gaseous fuel from the storage pressure to the respective one of the plurality of pressures, wherein the second-pressure brake thermal efficiency is the largest of the respective brake thermal efficiencies.

5. The internal combustion engine system as claimed in claim 1, wherein the storage pressure is less than a peak brake-thermal-efficiency pressure for the engine speed and the engine load condition, where the peak brake-thermal-efficiency pressure is an injection pressure that results in a peak brake thermal efficiency for the engine speed and the engine load condition.

6. The internal combustion engine system as claimed in claim 1, wherein the gaseous fuel comprises ammonia, biogas, ethane, hydrogen, methane, natural gas, propane, butane, renewable gaseous fuels, or mixtures of these fuels.

7. The internal combustion engine system as claimed in claim 1, wherein the storage-pressure brake thermal efficiency and the second-pressure brake thermal efficiency are effective brake thermal efficiencies and are further based on a reductant employed to mitigate emissions in an aftertreatment system, wherein the reductant contributes to an equivalent fuel consumption of the internal combustion engine but not to heat generated by combusting the gaseous fuel within a combustion chamber of the internal combustion engine.

8. The internal combustion engine system as claimed in claim 7, wherein the aftertreatment system includes at least one of a NOx reduction catalyst, a NOx trap, a selective catalytic reduction (SCR) catalyst, and a particulate filter.

9. The internal combustion engine system as claimed in claim 7, wherein when both the gaseous fuel and the reductant comprise hydrogen there is a fueling portion of hydrogen that is combusted in the combustion chamber to generate heat and a reductant portion of hydrogen that is employed in the aftertreatment system to mitigate emissions.

10. The internal combustion engine system as claimed in claim 9, wherein there is an unburned portion of hydrogen of the fueling portion of hydrogen that is not combusted in the combustion chamber, the controller is further programmed to determine the reductant portion of hydrogen based on the unburned portion of hydrogen, wherein the unburned portion of hydrogen and the reductant portion of hydrogen cooperate to mitigate emissions.

11. The internal combustion engine system as claimed in claim 7, wherein the controller is further programmed to convert a quantity of the reductant consumed in the aftertreatment system to a quantity of gaseous fuel equivalent, and the controller is further programmed to determine the equivalent fuel consumption as a sum of a quantity of gaseous fuel consumed by the internal combustion engine and the quantity of gaseous fuel equivalent of the reductant consumed by the aftertreatment system.

12. The internal combustion engine system as claimed in claim 11, wherein the controller is programmed with a conversion factor to convert the quantity of the reductant consumed in the aftertreatment system to the quantity of gaseous fuel equivalent of the reductant consumed by the aftertreatment system.

13. The internal combustion engine system as claimed in claim 12, wherein the controller is programmed to determine the quantity of gaseous fuel equivalent of the reductant consumed by the aftertreatment system as a product of the quantity of the reductant consumed in the aftertreatment system and the conversion factor.

14. The internal combustion engine system as claimed in claim 12, wherein the controller is programmed to a. determine the conversion factor as a ratio between a price of reductant per unit quantity over a price of the gaseous fuel per unit quantity;

b. determine the conversion factor as a ratio between a quantity of $CO_2$ produced per unit quantity of reductant consumed in the aftertreatment system over a quantity of $CO_2$ produced per unit quantity of gaseous fuel consumed in the internal combustion engine; or c. determine the conversion factor as a ratio between a lower heating value of the reductant over a lower heating value of the gaseous fuel.

15. A method of operating an internal combustion engine fueled with a gaseous fuel comprising:

storing the gaseous fuel in a gas state as a compressed gas in a storage vessel at a storage pressure, the storage pressure decreasing as the internal combustion engine consumes the gaseous fuel;

delivering the gaseous fuel from the storage vessel to a fuel rail, wherein the gaseous fuel is selectively introduced from the fuel rail into a combustion chamber of the internal combustion engine at an injection pressure;

selectively pressurizing the gaseous fuel from the storage pressure to a second pressure in the fuel rail;

for an engine speed and an engine load condition:

determining a storage-pressure brake thermal efficiency based on the injection pressure where the gaseous fuel is delivered to the fuel rail without increasing the storage pressure of the gaseous fuel whereby the injection pressure of the gaseous fuel is equal to the storage pressure of the gaseous fuel within a first margin;

determining a second-pressure brake thermal efficiency based on the injection pressure and an energy cost of pressurizing the gaseous fuel from the storage pressure to the second pressure whereby the injection pressure is equal to the second pressure within a second margin; and pressurizing the gaseous fuel from the storage pressure to the second pressure in the fuel rail when the second-pressure brake thermal efficiency is greater than the storage-pressure brake thermal efficiency.

16. The method as claimed in claim 15, wherein the determination of the second-pressure brake thermal efficiency includes an energetic cost of pressurizing the gaseous fuel from the storage pressure to the second pressure.

17. The method as claimed in claim 15, wherein the second pressure is one of a plurality of pressures above the storage pressure, the method further comprising determining respective brake thermal efficiencies for each pressure in the plurality of pressures, where each brake thermal efficiency is based on the respective one of the plurality of pressures and a respective energetic cost of pressurizing the gaseous fuel from the storage pressure to the respective one of the plurality of pressures, wherein the second-pressure brake thermal efficiency is the largest of the respective brake thermal efficiencies.

18. The method as claimed in claim 15, wherein the storage pressure is less than a peak brake-thermal-efficiency pressure for the engine speed and the engine load condition, where the peak brake-thermal-efficiency pressure is an injection pressure that results in a peak brake-thermal-efficiency for the engine speed and the engine load condition.

19. The method as claimed in claim 15, wherein the storage-pressure brake thermal efficiency and the second-pressure brake thermal efficiency are effective brake thermal efficiencies and are further based on a reductant employed to mitigate emissions in an aftertreatment system, wherein the reductant contributes to an equivalent fuel consumption of the internal combustion engine but not to heat generated by combusting the gaseous fuel within the combustion chamber.

20. The method as claimed in claim 19, wherein when both the gaseous fuel and the reductant are hydrogen there is a fueling portion of hydrogen that is combusted in the combustion chamber to generate heat and a reductant portion of hydrogen that is employed in the aftertreatment system to mitigate emissions.

21. The method as claimed in claim 20, wherein there is an unburned portion of hydrogen of the fueling portion of hydrogen that is not combusted in the combustion chamber, the method further comprises determining the reductant portion of hydrogen based on the unburned portion of hydrogen, wherein the unburned portion of hydrogen and the reductant portion of hydrogen cooperate to mitigate emissions.

22. The method as claimed in claim 19, further comprising converting a quantity of the reductant consumed in the aftertreatment system is converted to a quantity of gaseous fuel equivalent, and determining the equivalent fuel consumption as a sum of a quantity of gaseous fuel consumed by the internal combustion engine and the quantity of gaseous fuel equivalent of the reductant consumed by the aftertreatment system.

23. The method as claimed in claim 22, further comprising employing a conversion factor to convert the quantity of the reductant consumed in the aftertreatment system to the quantity of gaseous fuel equivalent of the reductant consumed by the aftertreatment system.

24. The method as claimed in claim 23, wherein the quantity of gaseous fuel equivalent of the reductant consumed by the aftertreatment system is a product of the quantity of the reductant consumed in the aftertreatment system and the conversion factor.

25. The method as claimed in claim 23, wherein the conversion factor is:

a. a ratio between a price of reductant per unit quantity over a price of the gaseous fuel per unit quantity;

b. a ratio between a quantity of $CO_2$ produced per unit quantity of reductant consumed in the aftertreatment system over a quantity of $CO_2$ produced per unit quantity of gaseous fuel consumed in the internal combustion engine; or c. a ratio between a lower heating value of the reductant over a lower heating value of the gaseous fuel.

* * * * *